United States Patent
Kim et al.

(10) Patent No.: US 12,022,347 B2
(45) Date of Patent: *Jun. 25, 2024

(54) METHOD AND APPARATUS FOR HANDOVER WITHOUT INTERRUPTION OF TRANSMISSION AND RECEPTION OF DATA IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,206

(22) Filed: May 5, 2023

(65) Prior Publication Data

US 2023/0276330 A1 Aug. 31, 2023

Related U.S. Application Data

(63) Continuation of application No. 17/670,327, filed on Feb. 11, 2022, now Pat. No. 11,678,242, which is a
(Continued)

(30) Foreign Application Priority Data

| Mar. 28, 2019 | (KR) | 10-2019-0035805 |
| Apr. 19, 2019 | (KR) | 10-2019-0046156 |
| Sep. 19, 2019 | (KR) | 10-2019-0115518 |

(51) Int. Cl.
*H04W 36/00* (2009.01)
*H04W 36/18* (2009.01)
*H04W 74/0833* (2024.01)

(52) U.S. Cl.
CPC ....... *H04W 36/18* (2013.01); *H04W 74/0833* (2013.01)

(58) Field of Classification Search
USPC .......................... 370/331–333; 455/436–444
See application file for complete search history.

(56) References Cited

U.S. PATENT DOCUMENTS

| 10,314,005 B2 | 6/2019 | Kim et al. |
| 2012/0106509 A1 | 5/2012 | Klingenbrunn et al. |
| (Continued) | | |

FOREIGN PATENT DOCUMENTS

| WO | 2016140757 A1 | 9/2016 |
| WO | 2017138977 A1 | 8/2017 |
| WO | 2020151639 A1 | 7/2020 |

OTHER PUBLICATIONS

International Search Report and Written Opinion of the International Searching Authority in connection with International Application No. PCT/KR2020/004358 dated Jul. 2, 2020, 8 pages.
(Continued)

*Primary Examiner* — Suhail Khan

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a terminal in a wireless communication system according to the disclosure includes receiving, from a first base station, a message including a command of handover from a first base station to a second base station through radio resource control (RRC) signaling; identifying
(Continued)

the message includes information indicating dual protocol stack handover; and receiving data until a cell of the first base station is released.

14 Claims, 14 Drawing Sheets

Related U.S. Application Data continuation of application No. 16/834,922, filed on Mar. 30, 2020, now Pat. No. 11,252,624.

(56) References Cited

U.S. PATENT DOCUMENTS

| | | |
|---|---|---|
| 2015/0009874 A1 | 1/2015 | Edara et al. |
| 2017/0127334 A1 | 5/2017 | Park |
| 2019/0037632 A1 | 1/2019 | Uchino et al. |
| 2020/0022035 A1 | 1/2020 | Kadiri et al. |
| 2020/0374773 A1 | 11/2020 | Zhang et al. |
| 2021/0345212 A1* | 11/2021 | Zhang .................. H04W 36/36 |

OTHER PUBLICATIONS

Supplementary European Search Report dated May 9, 2022, in connection with European Application No. 20779873.7, 12 pages.
Mediatek Inc., "Single active protocol stack and dual active protocol stacks to reduce HO interruption," R2-1900443, 3GPP TSG-RAN WG2 Meeting #105, Athens, Greece, Feb. 25-Mar. 1, 2019, 6 pages.
Nokia, et al., "Report from [104#61][LTE/feMOB] Solution directions for minimizing user data interruption for UL/DL (Nokia)," R2-1900619, 3GPP TSG-RAN WG2 Meeting #105, Athens, Greece, Feb. 25-Mar. 1, 2019, 49 pages.
Examination Report issued Jan. 17, 2024, in connection with Indian Patent Application No. 202137048527, 7 pages.
Office Action issued Mar. 18, 2024, in connection with Chinese Patent Application No. 202080032217.4, 13 pages.

* cited by examiner

METHOD AND APPARATUS FOR HANDOVER WITHOUT INTERRUPTION OF TRANSMISSION AND RECEPTION OF DATA IN NEXT-GENERATION MOBILE COMMUNICATION SYSTEM

CROSS-REFERENCE TO RELATED APPLICATIONS

This application is a continuation of application Ser. No. 17/670,327, filed Feb. 11, 2022, which is a continuation of application Ser. No. 16/834,922, filed Mar. 30, 2020, now U.S. Pat. No. 11,252,624, which is based on and claims priority under 35 U.S.C. § 119(a) of a Korean patent application number 10-2019-0035805, filed on Mar. 28, 2019, in the Korean Intellectual Property Office, and of a Korean patent application number 10-2019-0046156, filed on Apr. 19, 2019, in the Korean Intellectual Property Office, and of a Korean patent application number 10-2019-0115518, filed on Sep. 19, 2019, in the Korean Intellectual Property Office, the disclosures of which are incorporated by reference herein in their entirety.

BACKGROUND

1. Field

The disclosure relates to a method and an apparatus for efficient handover without interruption of transmission and reception of data during handover in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

In the next-generation mobile communication system, a method for efficient handover is required to support a seamless data service with low transmission latency.

In order to solve the above problem, the disclosure provides a method of a terminal in a wireless communication system, which may include: receiving, from a first base station, a message including a command of handover from a first base station to a second base station through radio resource control (RRC) signaling; identifying whether the message includes information indicating dual protocol stack handover; and receiving, from the first base station, data until a cell of the first base station is released in case that the message includes information indicating dual protocol stack handover.

In addition, in order to solve the above problem, the disclosure provides a method of a first base station in a wireless communication system, which may include: transmitting, to a terminal, a message including a handover command to a second base station through radio resource control (RRC) signaling; and transmitting, to the terminal, data until a cell of the first base station is released in case that the message includes information indicating dual protocol stack handover.

In addition, in order to solve the above problem, the disclosure provides a terminal in a wireless communication system, which may include: a transceiver; and a controller configured to receive, from a first base station via the transceiver, a message including a command of handover from a first base station to a second base station through radio resource control (RRC) signaling using the transceiver; identify whether the message includes information indicating dual protocol stack handover; and receive, from the first base station via the transceiver, data until a cell of the first base station is released in case that the message includes information indicating dual protocol stack handover.

Further, in order to solve the above problem, the disclosure provides a first base station in a wireless communication system, which may include: a transceiver; and a controller configured to transmit, to a terminal via the transceiver, a message including a handover command to a second base station through radio resource control (RRC) signaling, and, transmit, to the terminal via the transceiver, data until a cell of the first base station is released in case that the message includes information indicating dual protocol stack handover.

The disclosure proposes various methods for efficient handover in order to prevent the occurrence of data interruption time due to handover when performing handover in a next-generation mobile communication system, thereby supporting seamless data services.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
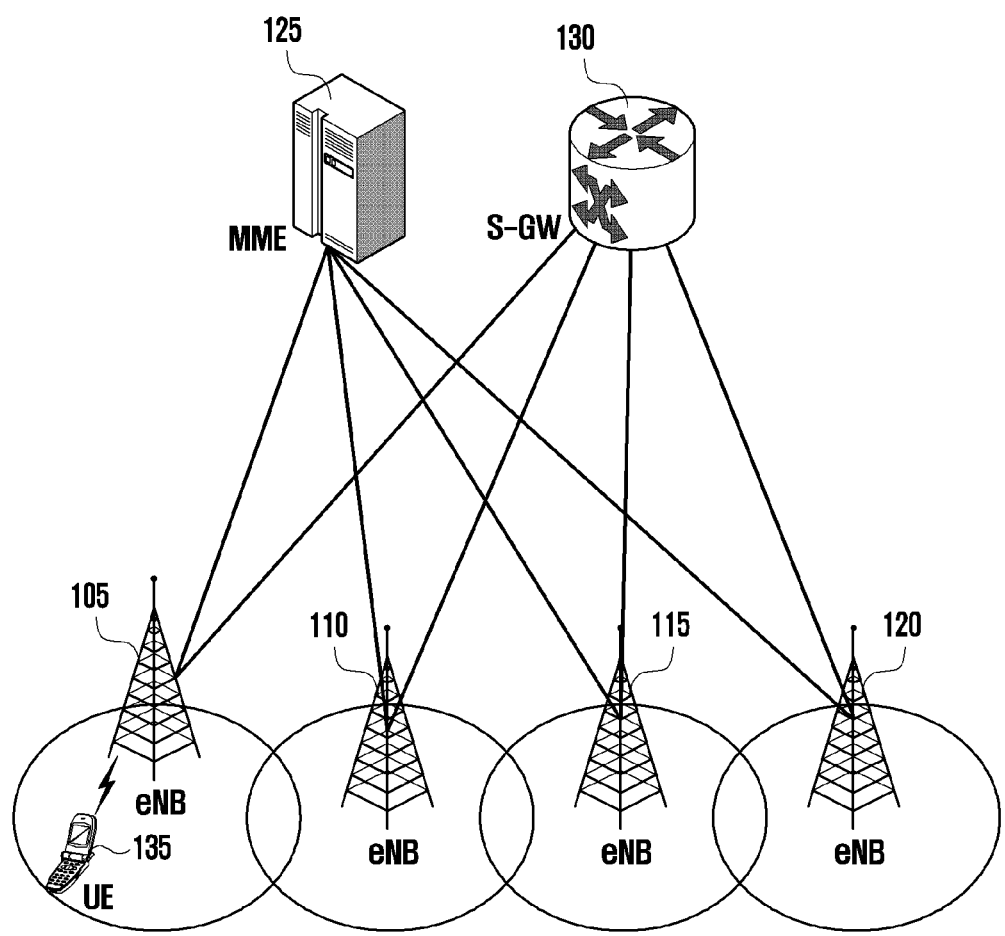
FIG. 1 is a diagram illustrating the structure of an LTE system to which the disclosure may be applied.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it may make the subject matter of the disclosure rather unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may refer to "gNB".

The disclosure proposes seamless handover methods capable of minimizing data interruption time due to handover or reducing the same to 0 milliseconds (ms) in a next-generation mobile communication system.

Specifically, efficient handover methods proposed in the disclosure may have one or more of a plurality of features as follows.

If a terminal that transmits and receives data to and from a source base station (uplink or downlink data transmission/reception) through respective protocol entities of a plurality of first bearers (PHY entities, MAC entities, RLC entities, or PDCP entities) receives a handover command message (or an RRC reconfiguration message) from the source base station, the terminal may configure new protocol entities of a plurality of second bearers corresponding to (for example, having the same bearer identifiers as) the protocol entities of the plurality of first bearers, and may maintain the transmission and reception of data (uplink or downlink data transmission/reception) to and from the source base station (without stopping the same) through the plurality of first bearers, thereby performing the transmission and reception of data (uplink or downlink data transmission/reception).

The protocol entities of the plurality of second bearers (PHY entities, MAC entities, RLC entities, or PDCP entities), which are newly configured after receiving the handover command message as described above, may be configured for transmitting and receiving data to and from a target base station, based on bearer configuration information or protocol entity information included in the handover command message.

The terminal may perform a procedure of random access to a target base station through protocol entities of the plurality of second bearers (for example, MAC entities) while transmitting and receiving data to and from the source base station (uplink or downlink data transmission/reception) through the protocol entities of the plurality of first bearers. In this case, the random access procedure may include transmitting a preamble, receiving a random access response, or transmitting message 3.

The terminal may complete a procedure of random access to the target base station through the protocol entities of the plurality of second bearers (for example, MAC entities) while transmitting and receiving data to and from the source base station (uplink and downlink data transmission and reception) through the protocol entities of the plurality of first bearers, and may transmit a handover completion message to the target base station through the protocol entities of the plurality of second bearers.

The terminal may complete a procedure of random access to the target base station through the protocol entities of the plurality of second bearers (for example, MAC entities) while transmitting and receiving data to and from the source base station (uplink and downlink data transmission and reception) through protocol entities of the plurality of first bearers, may transmit a handover completion message to the target base station through the protocol entities of the plurality of second bearers, and may perform (uplink or downlink) transmission and reception of data.

The terminal may stop transmitting and receiving data to and from the source base station through the protocol entities of the plurality of first bearers when a procedure of random access to the target base station is completed {for example, when a random access response is received, when a handover completion message (e.g., an "RRCReconfiguration" message) is transmitted to the target base station, or when data is initially transmitted to the target base station using a PUCCH or PUSCH uplink transmission resource}.

When a handover command message is received, the terminal may continue to transmit and receive data to and from the source base station (uplink or downlink data transmission/reception) through the protocol entities of the plurality of first bearers, and may perform a procedure of random access to the target base station through the protocol entities of the plurality of second bearers, and when a random access response is received, when a handover completion message is transmitted to the target base station, or when data is initially transmitted using a PUCCH or PUSCH uplink transmission resource, the terminal may stop transmitting uplink data to the source base station through the protocol entities of the plurality of first bearers, and may transmit uplink data to the target base station only through the protocol entities of the plurality of second bearers, and the terminal may continue to receive downlink data from the source base station through the protocol entities of the plurality of first bearers, and may continue to receive downlink data from the target base station through the protocol entities of the plurality of second bearers.

Hereinafter, the disclosure proposes efficient handover procedures without data interruption time, based on the above features.

FIG. 1 is a diagram illustrating the structure of an LTE system to which the disclosure may be applied.

Referring to FIG. 1, a radio access network of an LTE system may include evolved Node Bs (hereinafter, referred to as "ENBs", "Node Bs", or "base stations") 105, 110, 115, and 120, a mobility management entity (MME) 125, and a serving-gateway (S-GW) 130, as shown in FIG. 1. User equipment (hereinafter, referred to as "UE" or a "terminal") 135 accesses an external network through the ENBs 105 to 120 and the S-GW 130.

In FIG. 1, the ENBs 105 to 120 may correspond to existing Node Bs of a UNITS system. The ENB may be connected to the UE 135 via a radio channel, and may play a more complex role than the existing Node B. In the LTE system, all user traffic including real-time services, such as voice-over-IP (VoIP) through the Internet protocol, is served through a shared channel. Therefore, a device for collecting status information, such as buffer status, available transmission power status, and channel status of UEs, and performing scheduling is used. The ENBs 105 to 120 serve as such a device. One ENB typically controls multiple cells. For example, in order to realize a data rate of 100 Mbps, the LTE system uses, as radio access technology, orthogonal frequency division multiplexing (hereinafter, referred to as "OFDM") in, for example, a 20 MHz bandwidth. In addition, an adaptive modulation and coding (hereinafter, referred to as "AMC") scheme is applied to determine a modulation scheme and a channel coding rate in accordance with the channel status of a terminal. The S-GW 130 is a device for providing data bearers, and generates or removes data bearers under the control of the MIME 125. The MIME is a device that performs various control functions, as well as a mobility management function for a terminal, and may be connected to a plurality of base stations.

Figure 2:
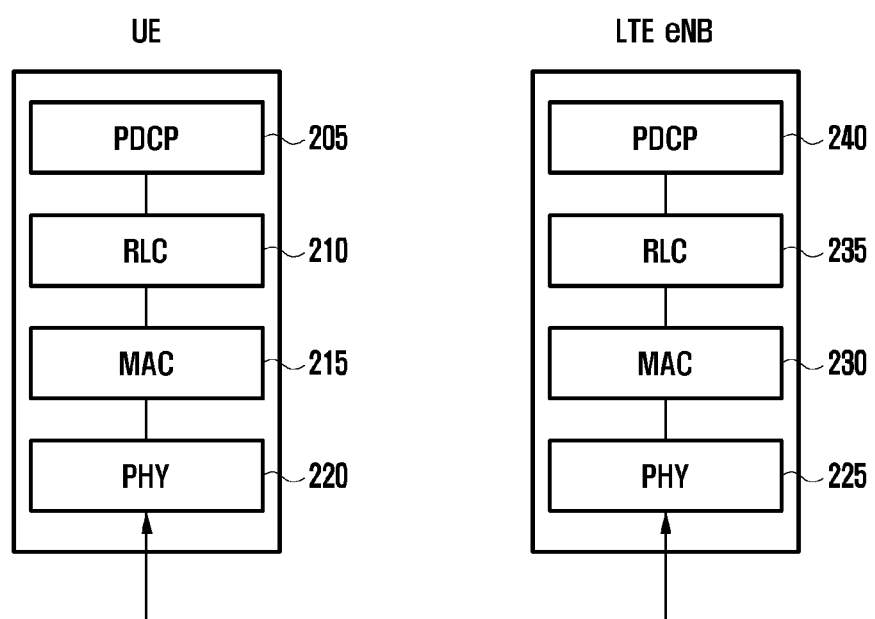
FIG. 2 is a diagram illustrating a radio protocol structure of an LTE system to which the disclosure may be applied.

FIG. 2 is a diagram illustrating a radio protocol structure of an LTE system to which the disclosure may be applied.

Referring to FIG. 2, the radio protocol of an LTE system includes packet data convergence protocol (PDCP) 205 or 240, radio link control (RLC) 210 or 235, and medium access control (MAC) 215 or 230 in a terminal and an ENB, respectively. The packet data convergence protocol (PDCP) 205 or 240 performs operations, such as IP header compression/decompression and the like. The primary functions of the PDCP are summarized as follows.

Header compression and decompression (ROHC only)
Transfer of user data
In-sequence delivery of upper layer PDUs at PDCP re-establishment procedure for RLC AM
Sequence reordering {for split bearers in DC (only support for RLC AM): PDCP PDU routing for transmission and PDCP PDU reordering for reception}
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (RLC) 210 or 235 reconfigures a PDCP PDU (packet data unit) to an appropriate size and performs ARQ operation and the like. The primary functions of the RLC are summarized as follows.

Data transfer function (transfer of upper layer PDUs)
ARQ function {error correction through ARQ (only for AM data transfer)}
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 215 or 230 is connected to a plurality of RLC entities configured in a terminal, multiplexes RLC PDUs into MAC PDUs, and demultiplexes RLC PDUs from MAC PDUs. The primary functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
Padding The physical layers 220 and 225 channel-code and modulate upper layer data, and convert the same into OFDM symbols that are then transmitted through a radio channel, or demodulate OFDM symbols received through a radio channel and channel-decode the same, and then transmit the same to upper layers.

Figure 3:
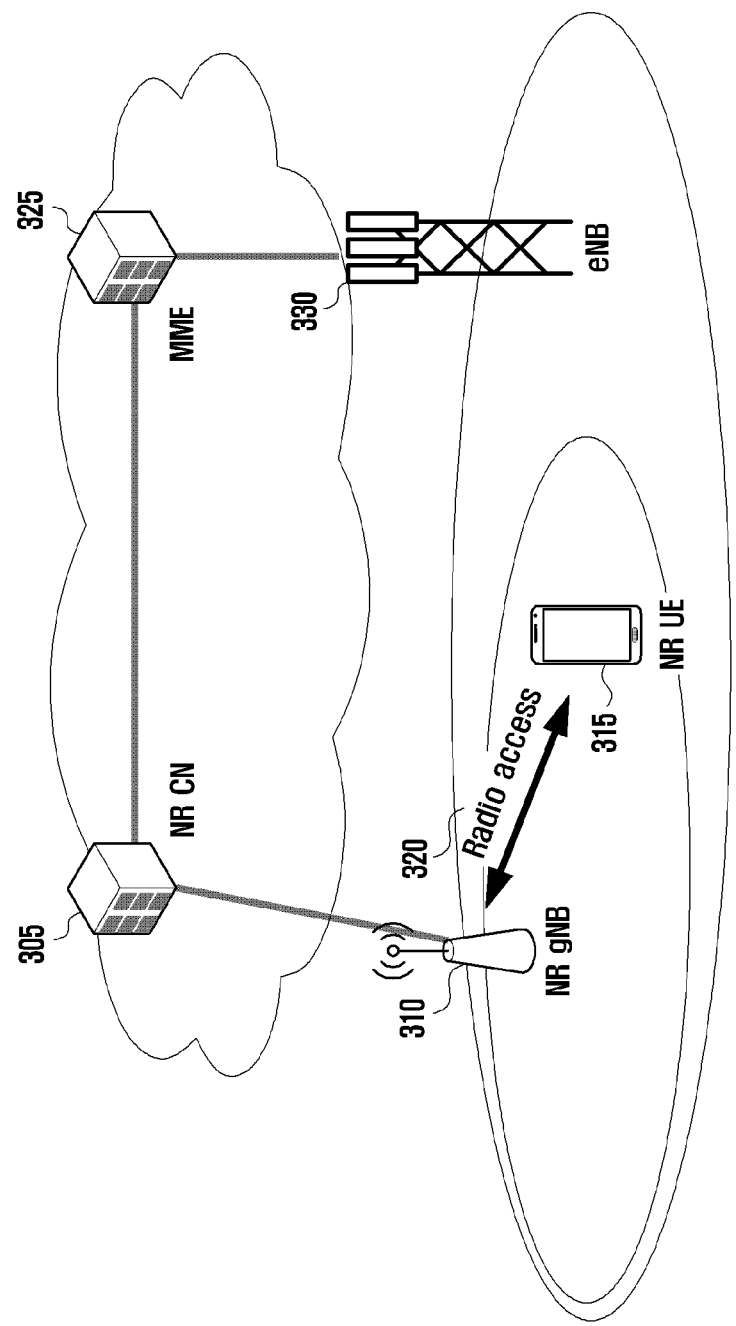
FIG. 3 is a diagram illustrating the structure of a next-generation mobile communication system to which the disclosure may be applied.

FIG. 3 is a diagram illustrating the structure of a next-generation mobile communication system to which the disclosure may be applied.

Referring to FIG. 3, a radio access network of a next-generation mobile communication system (hereinafter, referred to as "NR" or "5G") may include a new radio node B (hereinafter, referred to as an "NR gNB" or an "NR base station") 310 and a new radio core network (hereinafter, referred to as an "NR CN") 305. New radio user equipment (hereinafter, referred to as "NR UE" or a "terminal") 315 accesses an external network through the NR gNB 310 and the NR CN 305.

In FIG. 3, the NR gNB 310 corresponds to an evolved Node B (eNB) in an existing LTE system. The NR gNB 310 is connected to the NR UE 315 through a radio channel 320, and may provide services superior to those of the existing node B. In the next-generation mobile communication system, all user traffic is served through a shared channel. Therefore, a device for collecting status information, such as buffer status, available transmission power status, and channel status of UEs, and performing scheduling is used. The NR NB 310 serves as such a device.

One NR gNB may control multiple cells. In order to realize super-high data rates compared to the existing LTE system, the next-generation mobile communication system may have a bandwidth equal to or greater than the maximum bandwidth of the existing system. In addition, the next-generation mobile communication system may use, as radio access technology, orthogonal frequency division multiplexing (OFDM), and may further employ a beamforming technique in addition thereto. In addition, an adaptive modulation and coding (hereinafter, referred to as "AMC") scheme may be applied to determine a modulation scheme and a channel coding rate in accordance with the channel status of a terminal.

The NR CN 305 performs functions such as mobility support, bearer configuration, and QoS configuration. The NR CN is a device that performs various control functions, as well as a mobility management function for a terminal, and may be connected to a plurality of base stations. In addition, the next-generation mobile communication system may interwork with an existing LTE system, and the NR CN may be connected to the MME 325 through a network interface. The MME may be connected to the eNB 330, which is an existing base station.

Figure 4:
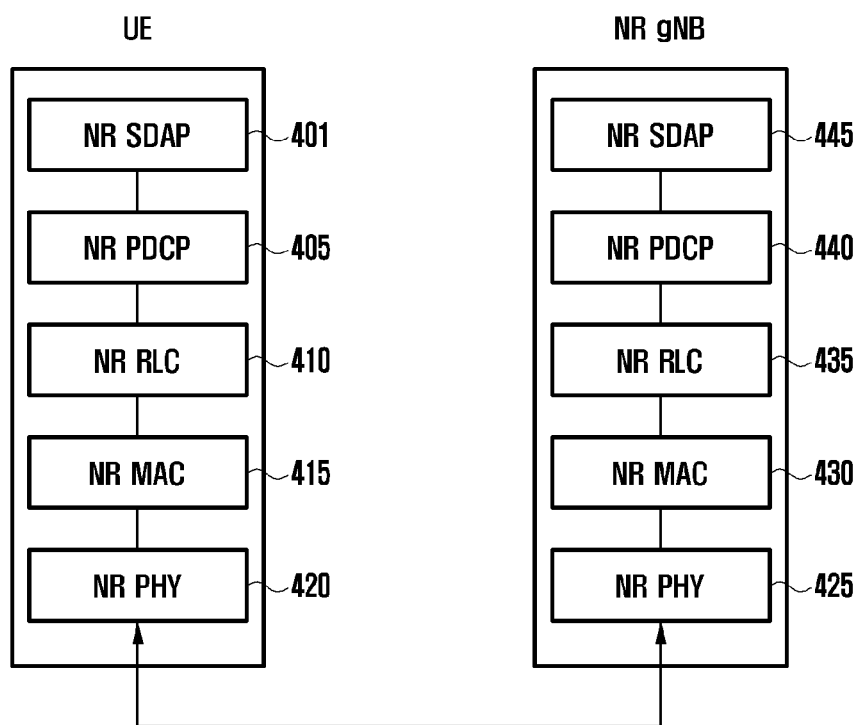
FIG. 4 is a diagram illustrating a radio protocol structure of a next-generation mobile communication system to which the disclosure may be applied.

FIG. 4 is a diagram illustrating a radio protocol structure of a next-generation mobile communication system to which the disclosure may be applied.

Referring to FIG. 4, the radio protocol of the next-generation mobile communication system includes NR SDAP 401 or 445, NR PDCP 405 or 440, NR RLC 410 or 435, and NR MAC 415 or 430 in a terminal and an NR base station, respectively.

The primary functions of the NR SDAP 401 or 445 may include some of the following functions.
Transfer of user plane data
Mapping between QoS flow and DRB for both downlink and uplink
Marking QoS flow ID in both downlink and uplink packets
Mapping reflective QoS flow to DRB for UL SDAP PDUs With regard to the SDAP entity, the terminal may receive a configuration indicating whether or not to use a header of the SDAP entity or whether or not to use functions of the SDAP entity for each PDCP entity, for each bearer, or for each logical channel through an RRC message. In the case where the SDAP header is configured, a 1-bit NAS reflective QoS configuration indicator and a 1-bit AS reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, or the like in order to support effective services.

The primary functions of the NR PDCP 405 or 440 may include some of the following functions.
Header compression and decompression (ROHC only)
Transfer of user data
In-sequence delivery of upper layer PDUs
Out-of-sequence delivery of upper layer PDUs
Sequence reordering (PDCP PDU reordering for reception)
Duplicate detection of lower layer SDUs
Retransmission of PDCP SDUs
Ciphering and deciphering
Timer-based SDU discard in uplink The above reordering function of the NR PDCP entity denotes a function of reordering PDCP PDUs received from a lower layer, based on a PDCP sequence number (SN), may include a function of transmitting data to an upper layer in the reordered order, may include a function of directly transmitting data to an upper layer without consideration of an order, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 410 or 435 may include some of the following functions.
Data transfer function (transfer of upper layer PDUs)
In-sequence delivery of upper layer PDUs
Out-of-sequence delivery of upper layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The above in-sequence delivery function of the NR RLC entity denotes a function of transferring RLC SDUs received from a lower layer to an upper layer in sequence, may include a function of, if one original RLC SDU is divided into a plurality of RLC SDUs and received, reassembling and transmitting the same, may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to the transmitting end, may include a function of making a request for retransmission of the lost RLC PDUs, may include a function of, if there is a lost RLC SDU, transmitting only the RLC SDUs prior to the lost RLC SDU to an upper layer in sequence, may include a function of, if a predetermined timer expires even though there is a lost RLC SDU, transmitting all RLC SDUs received before the timer starts to an upper layer in sequence, or may include a function of, if a predetermined timer expires even though there is a lost RLC SDU, transmitting all RLC SDUs received until the present to an upper layer in sequence. In addition, the RLC PDUs may be processed in the order of reception (in the order of arrival regardless of a serial number or a sequence number thereof), and may be transmitted to the PDCP entity in an out-of-sequence delivery manner. In the case of segments, the segments, which are stored in the buffer or will be received later, may be received and reconfigured into one complete RLC PDU, and the RLC PDU may be processed and transmitted to the PDCP entity. The NR RLC layer may not include a concatenation function, which may be performed in the NR MAC layer or may be replaced with a multiplexing function of the NR MAC layer.

The out-of-sequence delivery of the NR RLC entity denotes a function of directly delivering RLC SDUs received from a lower layer to an upper layer regardless of sequence, may include a function of, if one original RLC SDU is divided into a plurality of RLC SDUs and is received, reassembling and delivering the same, and may include a function of storing and ordering RLC SNs or PDCP SNs of the received RLC PDUs, thereby recording the lost RLC PDUs.

The NR MAC 415 or 430 may be connected to a plurality of NR RLC entities configured in a single terminal, and the primary functions of the NR MAC may include some of the following functions.
Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers 420 and 425 may perform operations of channel-coding and modulating the upper layer data into OFDM symbols and transmitting the same through a radio channel, or operations of demodulating and channel-decoding the OFDM symbols received through the radio channel and transmitting the same to the upper layer.

Figure 5:
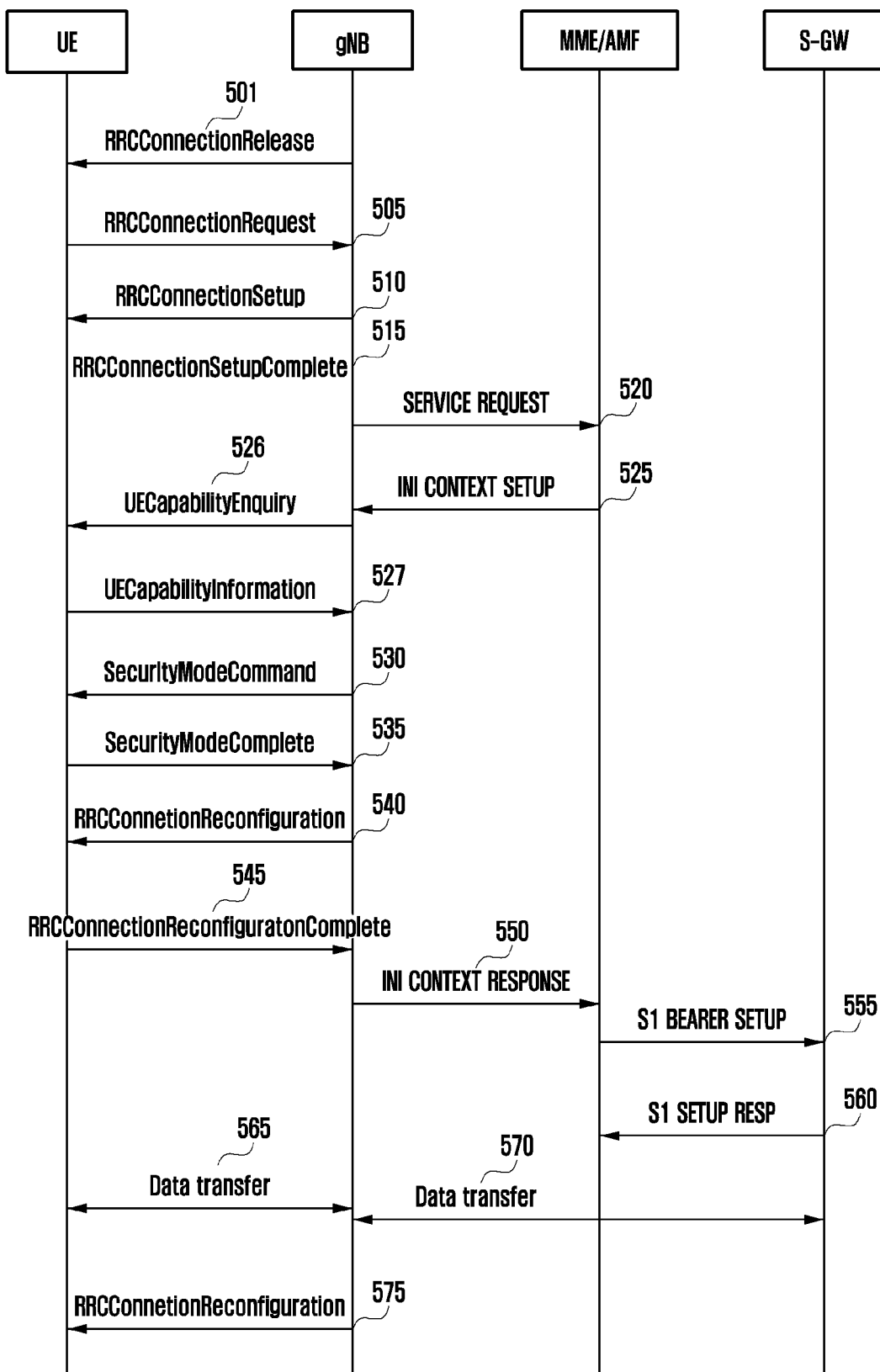
FIG. 5 is a diagram illustrating the procedure in which a terminal switches from an RRC idle mode to an RRC connected mode and establishes a connection with a network in the disclosure.

FIG. 5 is a diagram illustrating the procedure in which a terminal switches from an RRC idle mode to an RRC connected mode and establishes a connection with a network in the disclosure.

In FIG. 5, if there is no transmission and reception of data to and from a terminal that transmits and receives data in an RRC connected mode for a predetermined reason or for a performed period of time, a base station may transmit an "RRCConnectionRelease" message to the terminal such that the terminal switches to an RRC idle mode (501).

Afterwards, if a terminal that is not currently connected (hereinafter, referred to as an "idle mode UE") has data to be transmitted, the terminal performs an RRC connection establishment process with the base station. The terminal may establish reverse transmission synchronization with the base station through a random access process, and may transmit an "RRCConnectionRequest" message to the base station (505). The message may contain an identifier of the terminal, causes for establishing a connection (establishmentCause), and the like. The base station may transmit an "RRCConnectionSetup" message such that the terminal establishes an RRC connection (510).

The message includes configuration information for each service/bearer/RLC device, for each logical channel, or for each bearer, information on whether or not to use ROHC for each bearer/logical channel, ROHC configuration information (e.g., information on the ROHC version, initial information, etc.), "statusReportRequired" information (information through which the base station instructs the terminal to report the PDCP status), "drb-ContinueROHC" information {this is configuration information instructing to maintain and use ROHC configuration information as that information is, and may be included in PDCP entity configuration information (pdcp-config) to then be transmitted}. In addition, the message may contain RRC connection configuration information and the like. The bearer for RRC connection is also called a "signaling radio bearer (SRB)", and may be used in transmitting and receiving an RRC message, which is a control message between the terminal and the base station.

The terminal that has established an RRC connection transmits an "RRCConnetionSetupComplete" message to the base station (515). The message may include a control message called "SERVICE REQUEST" through which the terminal makes a request to the MME for configuring bearers for predetermined services. The base station transmits message "SERVICE REQUEST" included in the "RRCConnetionSetupComplete" message to the MME or AMF (520), and the MME or AMF determines whether or not to provide the service requested by the terminal.

As a result of the determination, if the terminal determines to provide the requested service, the MME or AMF may transmit an "INITIAL CONTEXT SETUP REQUEST" message to the base station (525). The message may include information such as quality-of-service (QoS) information to be applied when configuring a data radio bearer (DRB), and security-related information to be applied to the DRB (e.g., at least one of security keys, security algorithms, and the like may be included).

In addition, if the base station fails to receive capability information of the terminal from the MME or AMF, the base station may transmit a UE capability information request message to the terminal in order to identify the capability information of the terminal (526). Upon receiving the UE capability information request message, the terminal may configure and produce a UE capability information message and transmit the same to the base station (527).

The UE capability information message may include the type of handover method supported by the terminal. An indicator for each handover method may be defined, and the base station may identify the UE capability information, and may transmit, to the terminal, an indicator indicating the type of handover using a handover command message when instructing handover.

The base station may exchange a "SecurityModeCommand" message (530) and a "SecurityModeComplete" message (535) with the terminal in order to establish security. When the security is established, the base station transmits an "RRCConnectionReconfiguration" message to the terminal (540).

The message includes configuration information for each service/bearer/RLC device, for each logical channel, or for each bearer, information on whether or not to use ROHC for each bearer/logical channel, ROHC configuration information (e.g., information on the ROHC version, initial information, etc.), "statusReportRequired" information (information through which the base station instructs the terminal to report the PDCP status), "drb-ContinueROHC" information {this is configuration information instructing to maintain and use ROHC configuration information as that information is, and may be included in PDCP entity configuration information (pdcp-config) to then be transmitted}. In addition, the message contains RRC connection configuration information and the like. The bearer for RRC connection is also called a "signaling radio bearer (SRB)", and is used in transmitting and receiving an RRC message, which is a control message between the terminal and the base station.

In addition, the message includes configuration information on the DRB in which user data is processed, and the terminal configures a DRB by applying the above information and transmits an "RRCConnectionReconfigurationComplete" message to the base station (545). After completing the DRB configuration with respect to the terminal, the base station transmits an "INITIAL CONTEXT SETUP COMPLETE" message to the MME or AMF (550). Upon receiving the message, the MME or AMF exchanges an "S1 BEARER SETUP" message and an "S1 BEARER SETUP RESPONSE" message with the S-GW in order to configure S1 bearer (555 and 560). The S1 bearer is a connection for transmitting data, which is established between the S-GW and the base station, and corresponds to the DRB in a one-to-one manner. When all of the above processes are completed, the terminal transmits and receives data to and from the base station through the S-GW (565 and 570). The general data transmission process described above fundamentally includes three steps: RRC connection establishment, security configuration, and DRB configuration. In addition, the base station may transmit an RRC connection reconfiguration message to the terminal in order to indicate a new configuration to the terminal, add another configuration, or modify the configuration for some reasons (575).

In the disclosure, the bearer may encompass an SRB and a DRB, the SRB may denote "signaling radio bearer", and the DRB may denote "data radio bearer". The SRB is primarily used to transmit and receive RRC messages of RRC entities, and the DRB is primarily used to transmit and receive user layer data. In addition, a UM DRB refers to the DRB using an RLC entity operating in an unacknowledged mode (UM), and an AM DRB refers to the DRB using an RLC entity operating in an acknowledged mode (AM).

Figure 6:
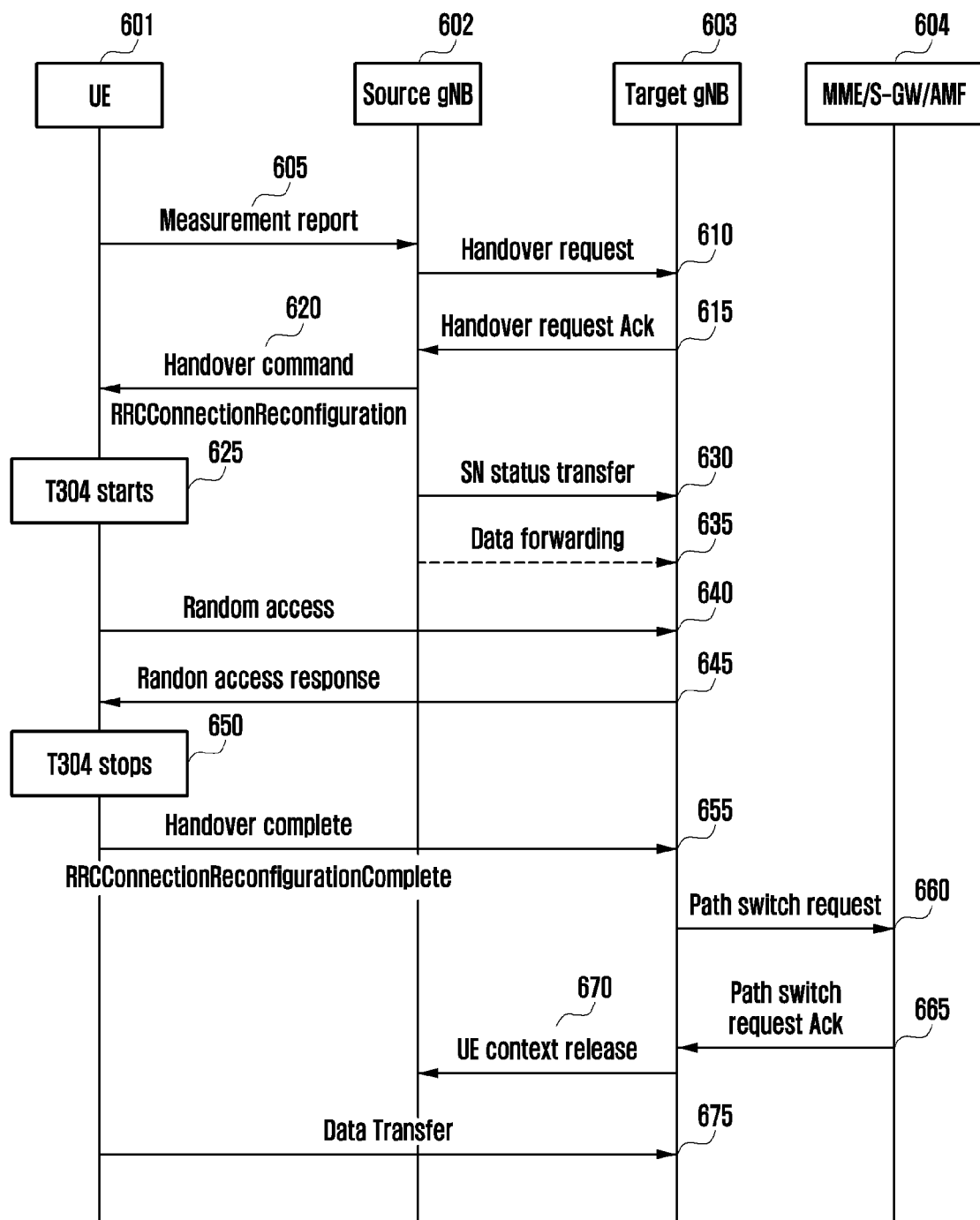
FIG. 6 is a diagram illustrating signaling procedures for performing handover in a next-generation mobile communication system.

FIG. 6 is a diagram illustrating signaling procedures for performing handover in a next-generation mobile communication system.

A terminal 601 in an RRC connected mode may transmit a cell measurement report to the current source base station (source eNB) 602 periodically or when a specific event is satisfied (605).

The source base station may determine whether or not the terminal is to perform handover to an adjacent cell, based on the measurement report. "Handover" is a technique that switches the source base station providing services to the terminal in a connected mode to another base station (or another cell of the same base station). If the source base station determines handover, the source base station may request handover by transmitting a handover (HO) request message to a new base station, that is, a "target base station (target eNB)" 603 that will provide services to the terminal (610). If the target base station accepts the handover request, the target base station may transmit a "HO request Ack" message to the source base station (615).

Upon receiving the message, the source base station may transmit a handover (HO) command message to the terminal (620). The source base station may transmit the handover command message to the terminal using an RRC connection reconfiguration message.

Upon receiving the message, the terminal may stop transmitting and receiving data to and from the source base station, and may start a timer T304 (625). If the terminal fails to perform handover to the target base station for a predetermined period of time, the timer T304 causes the terminal to return to its original configuration and switch to an RRC idle state. The source base station may transmit the sequence number (SN) status for uplink/downlink data to the target base station, and if there is downlink data, transmits the same to the target base station (630 and 635).

The terminal may attempt random access to the target cell indicated by the source base station (640). The random access is intended to inform the target cell that the terminal is moving through handover and to match the uplink synchronization. For the random access, the terminal transmits, to the target cell, a preamble corresponding to the preamble ID provided from the source base station or the preamble ID that is randomly selected.

After transmitting the preamble, the terminal may monitor whether or not a random access response (RAR) message is received from the target cell when a specific number of subframes elapses. The time period of the monitoring is called a "random access response window (RAR window)".

If a random access response (RAR) is received during the specific period of time (645), the terminal may transmit a handover (HO) complete message to the target base station using an RRC reconfiguration complete message (655). That is, the terminal may include information indicating completion of handover in the RRC reconfiguration complete message, and may transmit the same to the target base station.

Upon successfully receiving the random access response from the target base station as described above, the terminal may terminate the timer T304 (650). The target base station may request modification of paths from an MME/S-GW/AMF 604 in order to modify paths of the bearers that are configured for the source base station (660 and 665), and may transmit a request for deleting UE context of the terminal to the source base station (670). Accordingly, the terminal attempts to receive data (675) from the target base station from the start time of the RAR window, and transmits an RRC reconfiguration complete message after the RAR is received, thereby starting transmission and reception of data to and from the target base station.

The disclosure proposes seamless handover methods capable of minimizing data interruption time due to handover or reducing the same to 0 ms in the next-generation mobile communication system.

The terminal is able to configure a plurality of first bearers with respect to the source base station and perform transmission and reception of data (uplink or downlink data transmission/reception) through respective protocol entities of the bearers (PHY entities, MAC entities, RLC entities, or PDCP entities), and hereinafter, an example of the terminal having one bearer will be illustrated and described in the drawings and description for the convenience of description.

Figure 7:
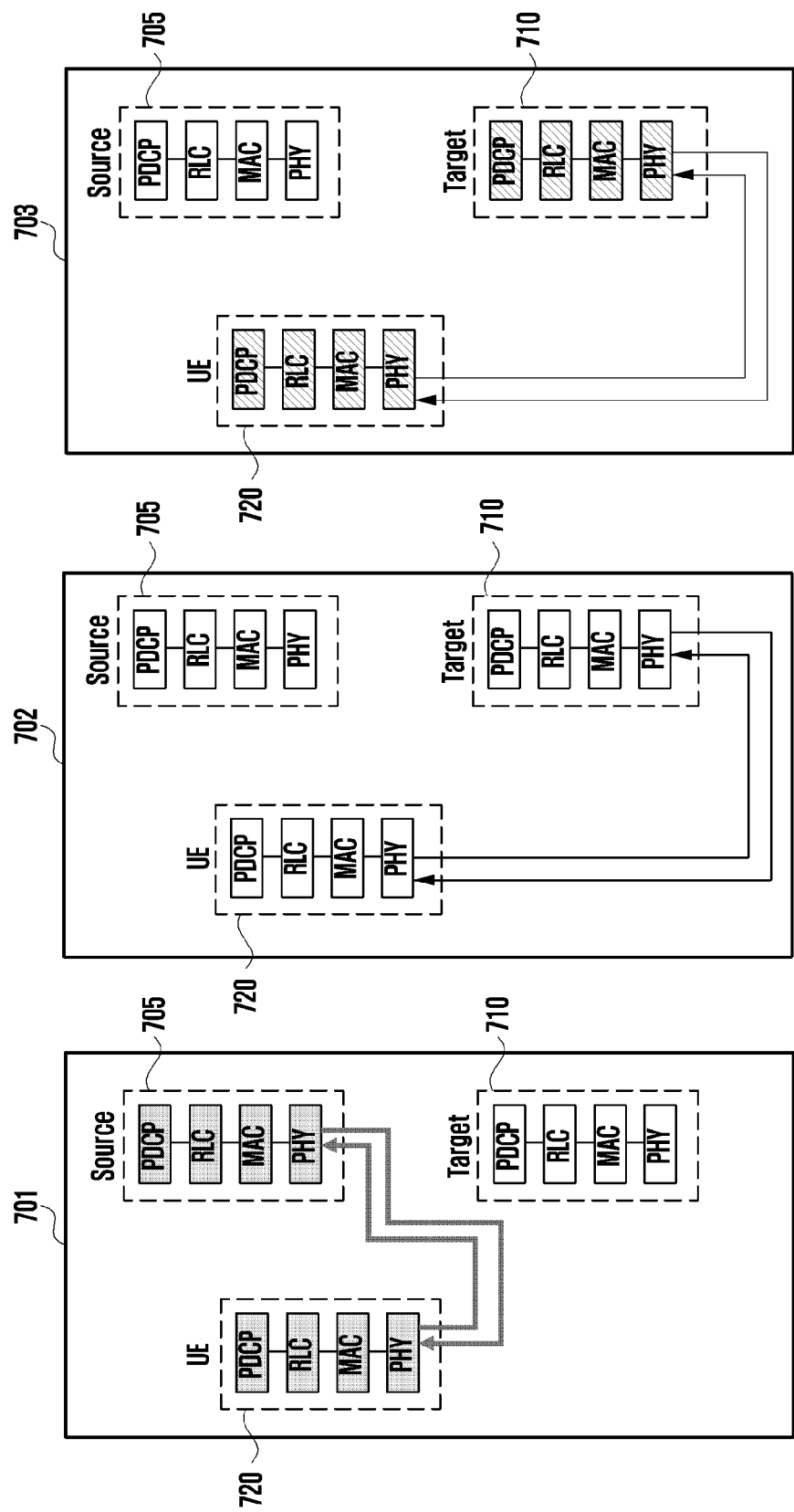
FIG. 7 is a diagram illustrating a first embodiment of an efficient handover method for minimizing data interruption time due to handover in the disclosure.

FIG. 7 is a diagram illustrating a first embodiment of an efficient handover method for minimizing data interruption time due to handover in the disclosure. Although described herein as various embodiments, such as the first embodiment or the second embodiment, this description should not be construed as limiting. Various embodiments can be combined or divided into separate embodiments without departing from the scope of the present disclosure.

Referring to FIG. 7, in step 701, even if the terminal 720 receives a handover command from the source base station 705 while transmitting and receiving data to and from the source base station, the terminal may continue to transmit and receive data to and from the source base station in order to minimize data interruption time that occurs during handover.

Therefore, in step 702, when the terminal 720 performs a random access procedure, transmits a preamble, or transmits initial data through an uplink transmission resource (e.g., a PUCCH or PUSCH transmission resource) to the target base station 710 indicated by the handover command message, the terminal 720 may stop transmitting and receiving data to and from the source base station (uplink data transmission and downlink data reception).

In addition, in step 703, the terminal 720 may complete a procedure of random access to the target base station, may transmit a handover completion message, and may start transmitting and receiving data to and from the target base station (uplink data transmission and downlink data reception).

Figure 8:
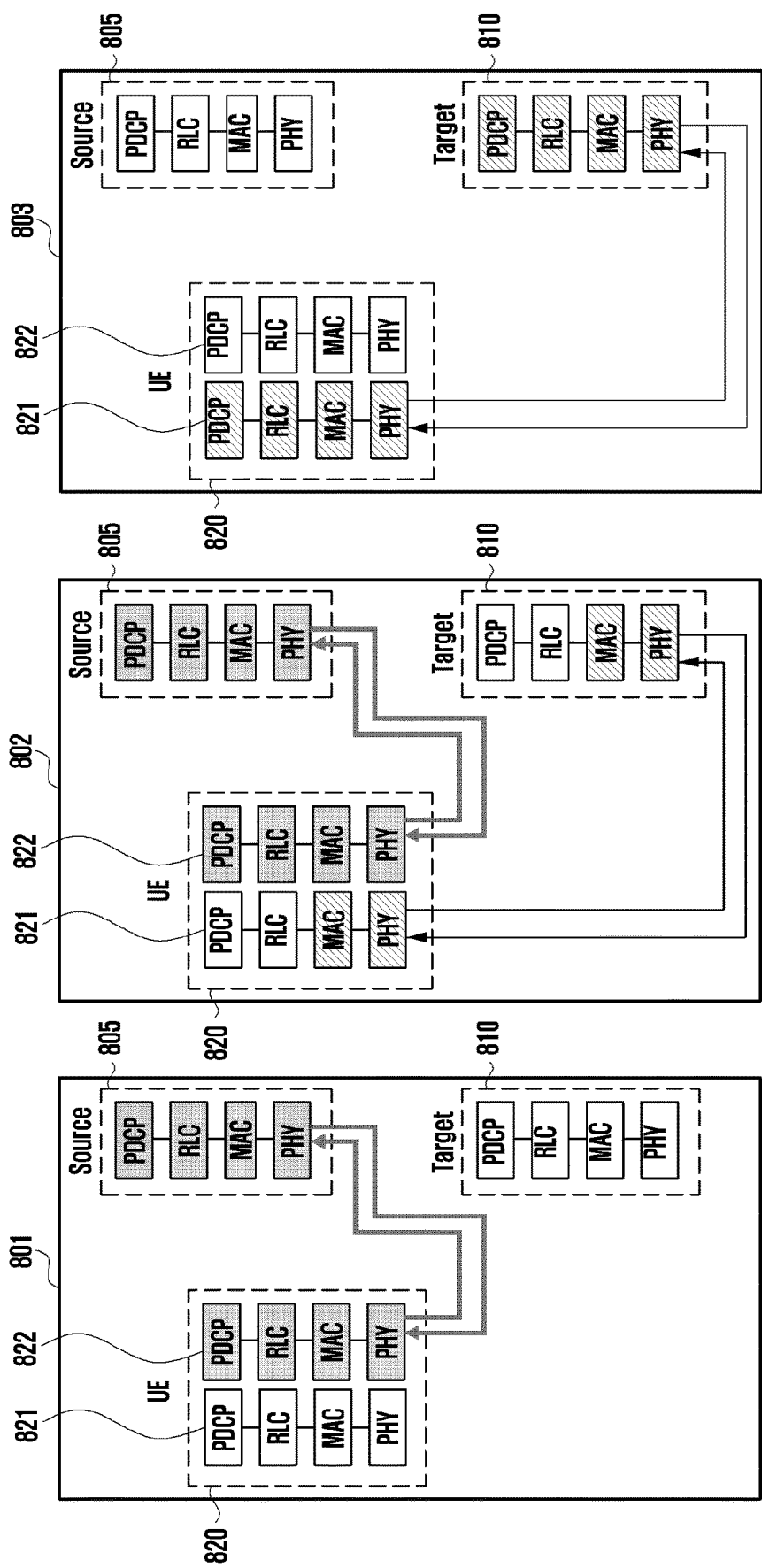
FIG. 8 is a diagram illustrating second and third embodiments of an efficient handover method for minimizing data interruption time due to handover in the disclosure.

FIG. 8 is a diagram illustrating second and third embodiments of an efficient handover method for minimizing data interruption time due to handover in the disclosure.

Referring to FIG. 8, in a second embodiment of the efficient handover method, in step 801, even if the terminal 820 receives a handover command from a source base station 805 while transmitting and receiving data to and from the source base station, the terminal may continue to transmit and receive data to and from the source base station through protocol entities 822 of a first bearer in order to minimize data interruption time that occurs during handover.

In addition, protocol entities (PHY entities, MAC entities, RLC entities, or PDCP entities) 821 of a second bearer for a target base station may be configured or established in advance according to the configuration included in the received handover command message. The second bearer may be configured and established so as to have the same bearer identifier as the first bearer in order to prevent the occurrence of data interruption time for each bearer. In addition, even if the terminal receives a handover command message from the source base station, the terminal may continue transmission and reception of data due to HARQ retransmission in order to prevent loss of data, and thus may not initialize a MAC entity of the first bearer.

In step 802, even when the terminal 820 performs a procedure of random access to the target base station 810 indicated by the handover command message through the protocol entities of the second bearer (for example, before a random access response is received after transmitting a preamble), the terminal may continue to transmit and receive data to and from the source base station (uplink data transmission and downlink data reception) through the protocol entities of the first bearer.

In addition, in step 803, the terminal 820 may complete a procedure of random access to the target base station 810 through the protocol entities of the second bearer, and may transmit and receive data (downlink data reception and uplink data transmission).

In addition, if a first condition is satisfied, the terminal may stop transmit and receiving data to and from the source base station 805 through the protocol entities 822 of the first bearer. In addition, the PDCP entity 821 of the second bearer may continue to perform the seamless transmission and reception of data to and from the target base station using information such as transmission/reception data, serial number information, header compression and decompression contexts, or the like, which are stored in the PDCP entity 822 of the first bearer. The first condition may include at least one of the following conditions.

When the terminal performs a procedure of random access to the target base station through the entities 821 of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource the source base station may determine the time to stop transmitting the downlink data to the terminal or the time to release the connection with the terminal, based on a predetermined method when performing the efficient handover proposed in the disclosure. For example, the predetermined method may include at least one of when a predetermined timer expires (the timer may start after indication of handover) or when an indication indicating that the terminal has successfully performed the handover to the target base station is received from the target base station.

In addition, if no downlink data is received from the source base station for a predetermined period of time, the terminal may determine that the connection with the source base station is released, and may release the connection.

When the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, the terminal may determine that the first condition is satisfied when the terminal receives a first uplink transmission resource allocated, included, or indicated in the random access response message.

Alternatively, if the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, the terminal may then determine that the first condition is satisfied when the terminal monitors a PDCCH and initially receives an uplink transmission resource through the PDCCH corresponding to the C-RNTI of the terminal or initially receives an indication thereof. As another method, if the size of the uplink transmission resource allocated by the random access response message is sufficient enough for the terminal to further transmit uplink data, as well as message 3, the terminal may determine that an initial uplink transmission resource has been received, thereby determining that the first condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

Meanwhile, referring to FIG. 8, in the third embodiment of the efficient handover method, in step 801, even if a terminal 820 receives a handover command from the source base station 805 while transmitting and receiving data to and from the source base station, in order to minimize data interruption time that occurs during handover, the terminal may continue to transmit and receive data to and from the source base station through protocol entities 822 of a first bearer.

In addition, protocol entities (PHY entities, MAC entities, RLC entities, or PDCP entities) 821 of the second bearer for the target base station may be configured or established in advance according to the configuration included in the received handover command message. The second bearer may be configured and established so as to have the same bearer identifier as the first bearer in order to prevent the occurrence of data interruption time for each bearer.

In addition, the handover command message may include an uplink transmission resource for the target base station, and may then transmit the same to the terminal in order to omit the random access procedure of the terminal to the target base station through the protocol entities of the second bearer.

As another method, in the case where handover without a random access procedure is indicated by the handover command message, the terminal may perform synchronization with the target base station without a random access procedure, and may receive an uplink transmission resource by monitoring a PDCCH from the target base station. As described above, data interruption time may be minimized by omitting the random access procedure.

In addition, even if the terminal receives a handover command message from the source base station, the terminal may continue transmission and reception of data due to HARQ retransmission in order to prevent loss of data, and thus may not initialize a MAC entity of the first bearer. In addition, in the case of an RLC in an AM, the RLC retransmission may be continuously performed.

In the third embodiment, in step 802, the operation in which the terminal 820 performs a procedure of random access to the target base station 810 indicated by a handover command message through the protocol entities of the second bearer may be omitted. The terminal may configure a handover completion message, and may transmit the same to the target base station through the protocol entities of the second bearer using a transmission resource of the target base station indicated by the handover command message.

As another method, in the case where the handover command message indicates handover without a random access procedure but does not include an uplink transmission resource to the target base station, the terminal may perform synchronization with the target base station without a random access procedure, and may receive an uplink transmission resource by monitoring a PDCCH from the target base station, thereby transmitting a handover completion message to the target base station. The terminal may continue transmitting and receiving data to and from the source base station (uplink data transmission and downlink data reception) through the protocol entities of the first bearer.

In the third embodiment, in step 803, the terminal 820 may transmit and receive data (downlink data reception and uplink data transmission) using the protocol entities of the second bearer.

In addition, if a first condition is satisfied, the terminal may stop transmitting and receiving data to and from the source base station 805 through the protocol entities 822 of the first bearer. In addition, the PDCP entity 821 of the second bearer may continue to perform the seamless transmission and reception of data to and from the target base station using information such as transmission/reception data, serial number information, header compression and decompression contexts, or the like, which are stored in the PDCP entity 822 of the first bearer. The first condition may include at least one of the following conditions.

When the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource the source base station may determine the time to stop transmitting the downlink data to the terminal or the time to release the connection with the terminal, based on a predetermined method when performing the efficient handover proposed in the disclosure. For example, the predetermined method may include at least one of when a predetermined timer expires (the timer may start after indication of handover) or when an indication indicating that the terminal has successfully performed the handover to the target base station is received from the target base station.

In addition, if no downlink data is received from the source base station for a predetermined period of time, the terminal may determine that the connection with the source base station is released, and may release the connection.

When the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} when the terminal transmits a predetermined preamble to the cell of the target base station and receives a random access response (RAR) message, the terminal may determine that the random access procedure is successfully completed. Accordingly, when the terminal receives a first uplink transmission resource allocated, included, or indicated in the random access response message, the terminal may determine that the first condition is satisfied.

Alternatively, if the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, when, thereafter, the terminal monitors the PDCCH and initially receives an uplink transmission resource through the PDCCH corresponding to the C-RNTI of the terminal or initially receives an indication thereof, the terminal may determine that the first condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the first condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

Figure 9:
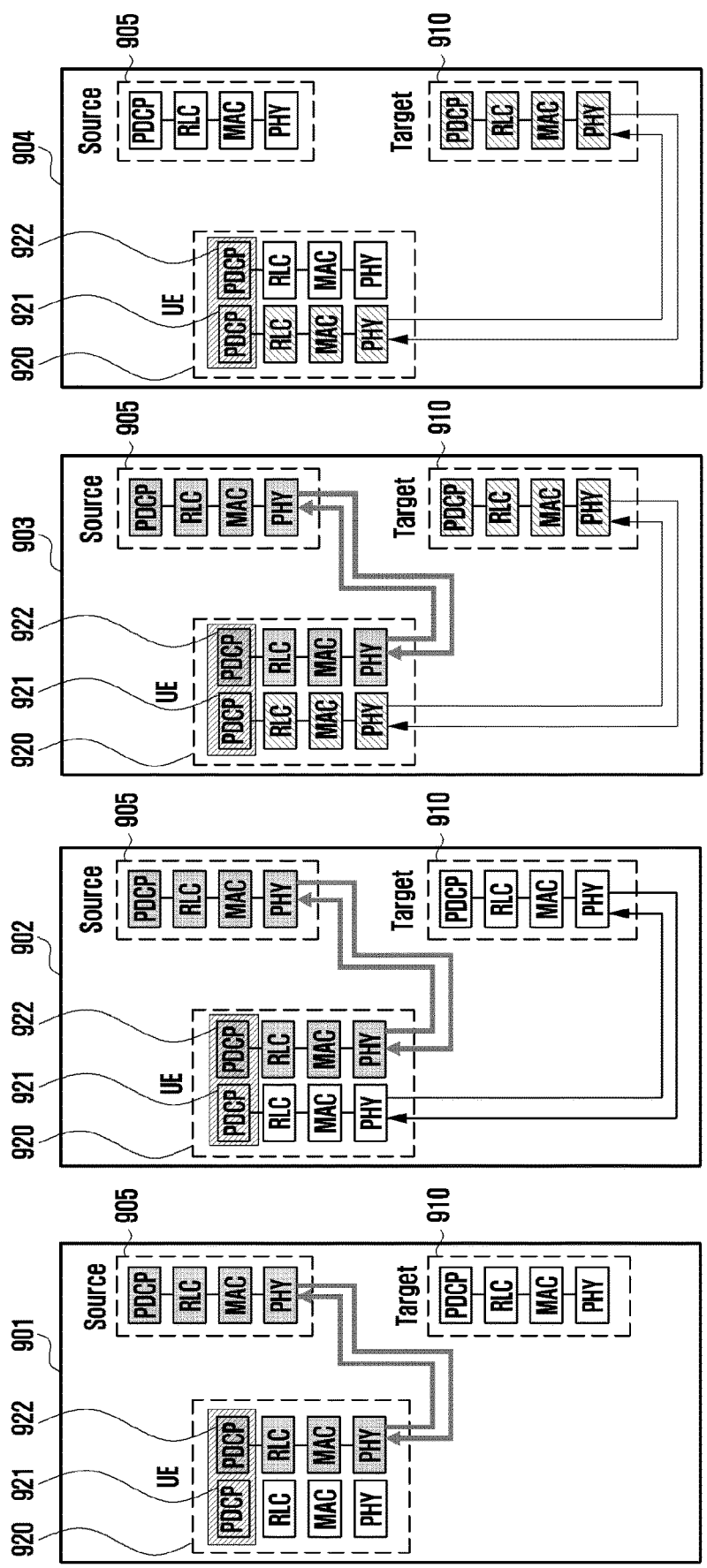
FIG. 9 is a diagram illustrating a fourth embodiment of an efficient handover method for minimizing data interruption time due to handover in the disclosure.

FIG. 9 is a diagram illustrating a fourth embodiment of an efficient handover method for minimizing data interruption time due to handover in the disclosure.

Referring to FIG. 9, in step 901, even if the terminal 920 receives a handover command from a source base station 905 while transmitting and receiving data to and from the source base station, the terminal may continue to transmit and receive data to and from the source base station through protocol entities 922 of a first bearer in order to minimize data interruption time that occurs during handover.

In addition, protocol entities (PHY entities, MAC entities, RLC entities, or PDCP entities) 921 of a second bearer for the target base station may be configured or established in advance according to the configuration included in the received handover command message. The second bearer may be configured and established so as to have the same bearer identifier as the first bearer in order to prevent the occurrence of data interruption time for each bearer.

In addition, in the fourth embodiment, the PDCP entity of the first bearer and the PDCP entity of the second bearer may be logically operated as a single PDCP entity, and a more detailed operation method thereof will be described with reference to FIG. 11.

In addition, in the case where the terminal is allowed to transmit uplink data both to the source base station and to the target base station, there may be a problem with reduction in coverage due to insufficient transmission power of the terminal or with determination of the base station to which a request for a transmission resource is to be made and uplink data is to be transmitted when transmitting uplink data (link selection problem). Therefore, in order to avoid the above problem, the terminal may transmit uplink data to the source base station and the target base station at different times through a time domain multiplexing (TDM) scheme when transmitting uplink data to the source base station or the target base station in the fourth embodiment.

As another method, the base station may configure a threshold through an RRC message, and the terminal may transmit uplink data to the source base station (or the target base station) if the size of the uplink data of the terminal is smaller than the threshold, and may transmit uplink data both to the source base station and to target base station if the size of the uplink data of the terminal is greater than the threshold. The transmission of uplink data may accompany a buffer status report (BSR) procedure for reporting the size of data to be transmitted or a scheduling request procedure.

In addition, even if the terminal receives a handover command message from the source base station, the terminal may continue transmission and reception of data due to HARQ retransmission in order to prevent loss of data, and thus may not initialize a MAC entity of the first bearer. In addition, in the case of an RLC entity in an AM, the RLC retransmission may be continuously performed.

In step 902, the terminal 920 may continue to transmit and receive data to and from the source base station (uplink data transmission and downlink data transmission) through the protocol entities of the first bearer of the terminal even when performing a procedure of random access to the target base station 910 indicated by the handover command message through the protocol entities of the second bearer.

In step 903, the terminal 920 may complete a procedure of random access to the target base station 910 through the protocol entities of the second bearer, may transmit and receive data (uplink data transmission and downlink data transmission), and may continue to transmit and receive data to and from the source base station (uplink data transmission and downlink data transmission) through the protocol entities of the first bearer.

In step 904, the terminal 920 may stop transmitting and receiving data to and from the source base station 805 through the protocol entities 922 of the first bearer if a first condition is satisfied. In addition, the PDCP entity 921 of the second bearer may continue to perform the seamless transmission and reception of data to and from the target base station using information such as transmission/reception data, serial number information, header compression and decompression contexts, or the like, which are stored in the PDCP entity 922 of the first bearer. The first condition may include at least one of the following conditions.

When the terminal performs a procedure of random access to the target base station through the entities 921 of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource the source base station may determine the time to stop transmitting the downlink data to the terminal or the time to release the connection with the terminal, based on a predetermined method when performing the efficient handover proposed in the disclosure. For example, the predetermined method may include at least one of when a predetermined timer expires (the timer may start after indication of handover) or when an indication indicating that the terminal has successfully performed the handover to the target base station is received from the target base station.

In addition, if no downlink data is received from the source base station for a predetermined period of time, the terminal may determine that the connection with the source base station is released, and may release the connection.

When the terminal receives, from the target base station, an indication {e.g., an RRC message (e.g., an "RRCReconfiguration" message), a MAC CE, an RLC control PDU, or a PDCP control PDU} to release the connection with the source base station when the terminal receives, from the source base station, an indication {e.g., an RRC message (e.g., an "RRCReconfiguration" message), a MAC CE, an RLC control PDU, or a PDCP control PDU} to release the connection with the source base station when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the first condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the first condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the first condition is satisfied.

In the case where a handover method that does not require a random access procedure (RACH-less handover) is indicated by the handover command message received by the terminal if the handover command message includes an uplink transmission resource to the target base station
  the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

In the case where the handover command message does not include an uplink transmission resource for the target base station
  when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfigurationComplete" message) using the uplink transmission resource and receives a UE identity confirmation MAC CE from the base station, the terminal may determine that the random access procedure is successfully completed, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

Figure 10:
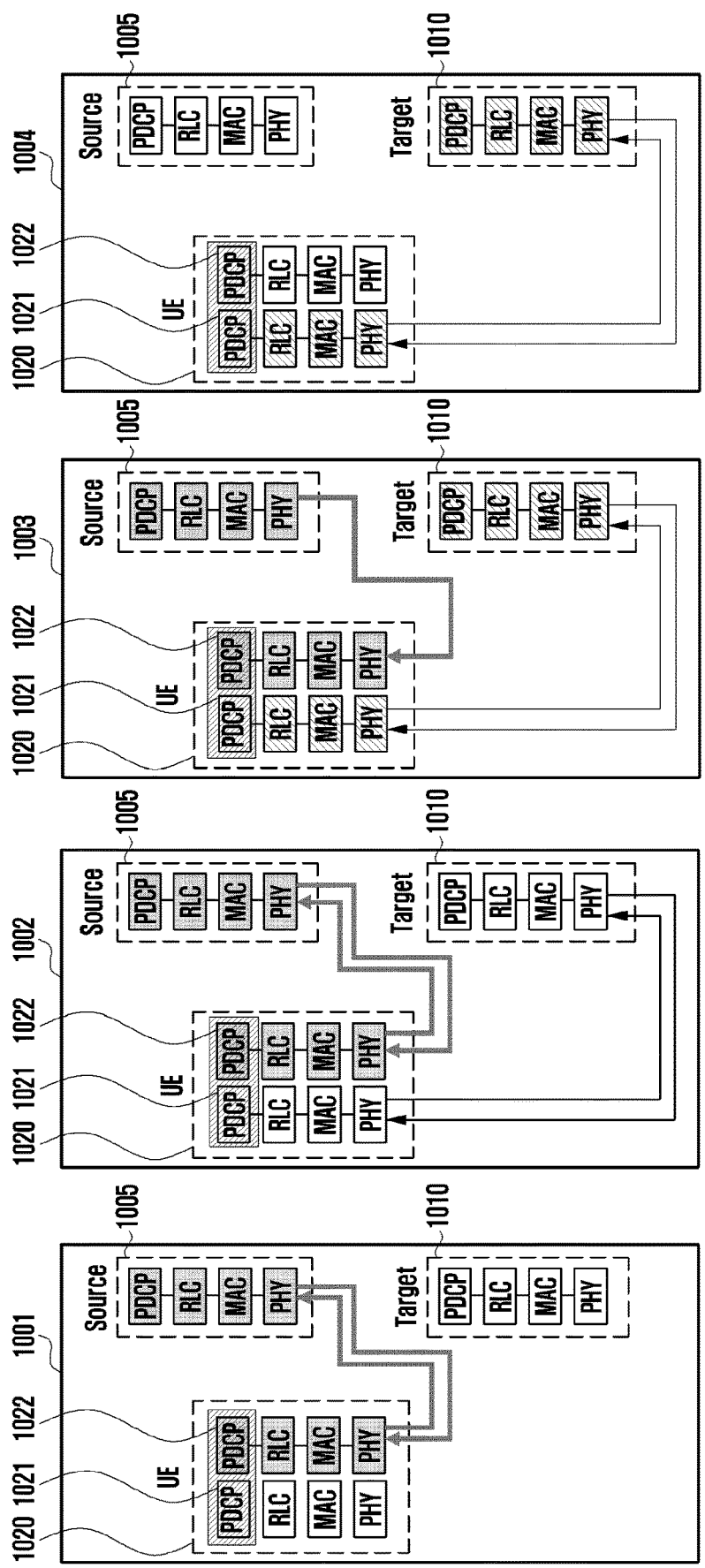
FIG. 10 is a diagram illustrating a fifth embodiment of an efficient handover method for minimizing data interruption time due to handover in the disclosure.

FIG. 10 is a diagram illustrating a fifth embodiment of an efficient handover method for minimizing data interruption time due to handover in the disclosure.

Referring to FIG. 10, in a fifth embodiment, in step 1001, even if the terminal 1020 receives a handover command from a source base station 1005 while transmitting and receiving data to and from the source base station, the terminal may continue to transmit and receive data to and from the source base station through protocol entities 1022 of a first bearer in order to minimize data interruption time that occurs during handover.

In addition, protocol entities (PHY entities, MAC entities, RLC entities, or PDCP entities) 1021 of a second bearer for the target base station may be configured or established in advance according to the configuration included in the received handover command message. The second bearer may be configured and established so as to have the same bearer identifier as the first bearer in order to prevent the occurrence of data interruption time for each bearer.

In addition, in the fifth embodiment, the PDCP entity of the first bearer and the PDCP entity of the second bearer may be logically operated as a single PDCP entity, and a more detailed operation method thereof will be described with reference to FIG. 11.

In addition, in the case where the terminal is allowed to transmit uplink data both to the source base station and to the target base station in the fifth embodiment, there may be a problem with reduction in coverage due to insufficient transmission power of the terminal or with determination of the base station to which a request for a transmission resource is to be made and uplink data is to be transmitted when transmitting uplink data (link selection problem). Therefore, in order to avoid the above problem, the terminal may transmit uplink data to only one of the source base station or the target base station in the fifth embodiment.

Therefore, the terminal may make a request for scheduling to only one of the source base station and the target base station, may report the size of data to be transmitted in the PDCP entity {e.g., a buffer status report (BSR)} to only one of the source base station and the target base station, may receive an uplink transmission resource, and may then transmit uplink data to only one base station. In addition, even if the terminal receives a handover command message from the source base station, the terminal may continue transmission and reception of data due to HARQ retransmission in order to prevent loss of data, and thus may not initialize a MAC entity of the first bearer. In addition, in the case of an RLC entity in an AM, the RLC retransmission may be continuously performed.

In the fifth embodiment, in step 1002, the terminal 1020 may continue to transmit and receive data to and from the source base station (uplink data transmission and downlink data transmission) through the protocol entities of the first bearer even when performing a procedure of random access to the target base station 1010 indicated by the handover command message through the protocol entities of the second bearer.

In the fifth embodiment, in step 1003, the terminal 1020 may stop transmitting and receiving data to and from the source base station through the protocol entities 1022 of the first bearer if a second condition is satisfied, may transmit uplink data to the target base station through the protocol entities 1021 of the second bearer, and may continue receiving downlink data from the source base station and the target base station through the protocol entities of the first bearer and the second bearer. In addition, the PDCP entity 1021 of the second bearer may continue to perform the seamless transmission and reception of data to and from the target base station using information such as transmission/reception data, serial number information, header compression and decompression contexts, or the like, which are stored in the PDCP entity 1022 of the first bearer.

The second condition may include at least one of the following conditions.

When the terminal performs a procedure of random access to the target base station through the entities 1021 of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource when the terminal receives, from the target base station, an indication {e.g., an RRC message (e.g., an "RRCReconfiguration" message), a MAC CE, an RLC control PDU, or a PDCP control PDU} to release the connection with the source base station and to switch the uplink to the target base station when the terminal receives, from the source base station, an indication {e.g., an RRC message (e.g., an "RRCReconfiguration" message), a MAC CE, an RLC control PDU, or a PDCP control PDU} to release the connection with the source base station and to switch the uplink to the target base station when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the second condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated} the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the second condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the second condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the second condition is satisfied. As another method, when the terminal receives a first uplink transmission resource through a PDCCH corresponding to a C-RNTI of the terminal by monitoring the PDCCH after a random access procedure is successfully completed, the terminal may determine that the second condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the second condition is satisfied. As another method, when the terminal receives a first uplink transmission resource through a PDCCH corresponding to a C-RNTI of the terminal by monitoring the PDCCH after a random access procedure is successfully completed, the terminal may determine that the second condition is satisfied.

In the case where the terminal is able to continue to receive downlink data from the source base station and the target base station through the protocol entities of the first bearer and the second bearer, in order to facilitate reception of downlink data from the source base station (or the target base station) or facilitate the source base station (or the target base station) to transmit downlink data, for AM bearers, an RLC status report other than data is allowed to be continuously transmitted to the source base station (or the target base station) in uplink through the protocol entities of the first bearer (or the second bearer). This is due to the fact that if an RLC status report of successful delivery is not indicated (that is, if the RLC status report is not received) after the AM bearers transmit data to a transmitting end, the AM bearers are unable to continue to transmit data thereafter.

In addition, in the fifth embodiment, in step 1003, even if the terminal 1020 stops transmitting uplink data to the source base station through the protocol entities 1022 of the first bearer because the second condition is satisfied, and makes a switch to start transmitting uplink data to the target base station through the protocol entities 1021 of the second bearer, in order to facilitate reception of downlink data from the source base station (or the target base station) or facilitate the source base station (or the target base station) to transmit downlink data, the terminal may allow continuous transmission of HARQ ACK or HARQ NACK information or PDCP control data (for example, a PDCP status report or ROHC feedback information) through the protocol entities of the first bearer (or the second bearer).

In addition, in the fifth embodiment, in step 1003, even if the terminal 1020 stops transmitting uplink data to the source base station through the protocol entities 1022 of the first bearer because the second condition is satisfied, and makes a switch to start transmitting uplink data to the target base station through the protocol entities 1021 of the second bearer, the terminal may continue transmission of data due to retransmission of HARQ of a MAC entity or transmission of data due to retransmission of an RLC entity in an AM in order to prevent loss of data to the source base station.

In addition, in the fifth embodiment, in step 1003, if the terminal 1020 stops transmitting uplink data to the source base station through the protocol entities 1022 of the first bearer because the second condition is satisfied, and makes a switch to start transmitting uplink data to the target base station through the protocol entities 1021 of the second bearer, the source base station or the target base station may allocate transmission resources to the terminal by dividing time such that the uplink transmission resource to the target base station and the uplink transmission resource to the source base station do not collide with (or do not overlap) each other. If the uplink transmission resource to the target base station overlaps the uplink transmission resource to the source base station, the terminal may prioritize the uplink transmission resource to the source base station in order to maintain transmission of downlink data from the source base station, thereby performing the transmission of data to the source base station.

Alternatively, if the uplink transmission resource to the target base station overlaps the uplink transmission resource to the source base station, the terminal may prioritize the uplink transmission resource to the target base station in order to maintain transmission of downlink data from the target base station, thereby performing transmission of data to the target base station.

Specifically, in the case where handover corresponding to the fifth embodiment of the disclosure is indicated when receiving a handover command message, the terminal may perform scheduling request through a first protocol entity until the second condition is satisfied, may transmit a buffer status report to the source base station, may receive an uplink transmission resource, may transmit uplink data, and may receive downlink data from the source base station.

However, if the second condition is satisfied, the terminal may no longer transmit data to the source base station, may switch the uplink to perform scheduling request through the second protocol entity, may transmit a buffer status report to the target base station, may receive an uplink transmission resource, and may transmit uplink data to the target base station.

However, the terminal may continue to receive downlink data from the source base station, and may continue to transmit HARQ ACK, HARQ NACK, an RLC status report, or PDCP control data (for example, a PDCP status report or ROHC feedback information) corresponding to the downlink data. The terminal may also receive downlink data from the target base station if the second condition is satisfied.

In the fifth embodiment, in step 1004, the terminal 1020 may stop receiving downlink data from the source base station 1005 through the protocol entities 1022 of the first bearer if a first condition is satisfied. In addition, the PDCP entity 1021 of the second bearer may continue to perform the seamless transmission and reception of data to and from the target base station using information such as transmission/reception data, serial number information, header compression and decompression contexts, or the like, which are stored in the PDCP entity 1022 of the first bearer. The first condition may include at least one of the following conditions.

When the terminal performs a procedure of random access to the target base station through the entities 1021 of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource the source base station may determine the time to stop transmitting the downlink data to the terminal or the time to release the connection with the terminal, based on a predetermined method when performing the efficient handover proposed in the disclosure. For example, the predetermined method may include at least one of when a predetermined timer expires (the timer may start after indication of handover) or when an indication indicating that the terminal has successfully performed the handover to the target base station is received from the target base station.

In addition, if no downlink data is received from the source base station for a predetermined period of time, the terminal may determine that the connection with the source base station is released, and may release the connection.

When the terminal receives, from the target base station, an indication {e.g., an RRC message (e.g., an "RRCReconfiguration" message), a MAC CE, an RLC control PDU, or a PDCP control PDU} to release the connection with the source base station when the terminal receives, from the source base station, an indication {e.g., an RRC message (e.g., an "RRCReconfiguration" message), a MAC CE, an RLC control PDU, or a PDCP control PDU} to release the connection with the source base station when the terminal fails to receive downlink data from the source base station for a predetermined period of time when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the first condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the first condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the first condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

FIG. 10 may illustrate specific steps in a 5-$2^{nd}$ embodiment of an efficient handover method for minimizing data interruption time due to handover in the disclosure.

Referring to FIG. 10, in a 5-$2^{nd}$ embodiment, in step 1001, even if the terminal 1020 receives a handover command from a source base station 1005 while transmitting and receiving data to and from the source base station, the terminal may continue to transmit and receive data to and from the source base station through protocol entities 1022 of a first bearer in order to minimize data interruption time that occurs during handover.

In addition, protocol entities (PHY entities, MAC entities, RLC entities, or PDCP entities) 1021 of a second bearer for the target base station may be configured or established in advance according to the configuration included in the received handover command message. The second bearer may be configured and established so as to have the same bearer identifier as the first bearer in order to prevent the occurrence of data interruption time for each bearer.

In addition, in the 5-$2^{nd}$ embodiment, the PDCP entity of the first bearer and the PDCP entity of the second bearer may be logically operated as a single PDCP entity, and a more detailed operation method thereof will be described with reference to FIG. 11.

In addition, in the 5-$2^{nd}$ embodiment, In addition, in the case where the terminal is allowed to transmit uplink data both to the source base station and to the target base station, there may be a problem with reduction in coverage due to insufficient transmission power of the terminal or with determination of the base station to which a request for a transmission resource is to be made and uplink data is to be transmitted when transmitting uplink data (link selection problem). Therefore, in order to avoid the above problem, the terminal may transmit uplink data to only one of the source base station and the target base station in the 5-$2^{nd}$ embodiment.

Therefore, the terminal may make a request for scheduling to only one of the source base station and the target base station, may report the size of data to be transmitted in the PDCP entity {e.g., a buffer status report (BSR)} to only one of the source base station and the target base station, may receive an uplink transmission resource, and may then transmit uplink data to only one base station. In addition, even if the terminal receives a handover command message from the source base station, the terminal may continue transmission and reception of data due to HARQ retransmission in order to prevent loss of data, and thus may not initialize a MAC entity of the first bearer.

In the 5-$2^{nd}$ embodiment, in step 1002, the terminal 1020 may continue to transmit and receive data to and from the source base station (uplink data transmission and downlink data transmission) through the protocol entities of the first bearer even when performing a procedure of random access to the target base station 1010 indicated by the handover command message through the protocol entities of the second bearer.

In the 5-$2^{nd}$ embodiment, in step 1003, the terminal 1020 may stop transmitting uplink data to the source base station through the protocol entities 1022 of the first bearer if a second condition is satisfied, may transmit uplink data to the target base station through the protocol entities 1021 of the second bearer, and may continue receiving downlink data from the source base station and the target base station through the protocol entities of the first bearer and the second bearer. In this case, the terminal may perform an RLC re-establishment procedure for the transmission RLC entity among the protocol entities when stopping transmitting uplink data to the source base station through the protocol entities 1022 of the first bearer. In addition, the PDCP entity 1021 of the second bearer may continue to perform the seamless transmission and reception of data to and from the target base station using information such as transmission/reception data, serial number information, header compression and decompression contexts, or the like, which are stored in the PDCP entity 1022 of the first bearer. The second condition may include one of the following conditions.

When the terminal performs a procedure of random access to the target base station through the entities 1021 of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource when the terminal receives, from the target base station, an indication {e.g., an RRC message (e.g., an "RRCReconfiguration" message), a MAC CE, an RLC control PDU, or a PDCP control PDU} to release the connection with the source base station and to switch the uplink to the target base station when the terminal receives, from the source base station, an indication {e.g., an RRC message (e.g., an "RRCReconfiguration" message), a MAC CE, an RLC control PDU, or a PDCP control PDU} to release the connection with the source base station and to switch the uplink to the target base station when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the second condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the second condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the second condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the second condition is satisfied. As another method, when the terminal receives a first uplink transmission resource through a PDCCH corresponding to a C-RNTI of the terminal by monitoring the PDCCH after a random access procedure is successfully completed, the terminal may determine that the second condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the second condition is satisfied. As another method, when the terminal receives a first uplink transmission resource through a PDCCH corresponding to a C-RNTI of the terminal by monitoring the PDCCH after a random access procedure is successfully completed, the terminal may determine that the second condition is satisfied.

In the case where the terminal is able to continue to receive downlink data from the source base station and the target base station through the protocol entities of the first bearer and the second bearer, in order to facilitate reception of downlink data from the source base station (or the target base station) or facilitate the source base station (or the target base station) to transmit downlink data, for AM bearers, an RLC status report other than data is allowed to be continuously transmitted to the source base station (or the target base station) in uplink through the protocol entities of the first bearer (or the second bearer). This is due to the fact that if an RLC status report of successful delivery is not indicated (that is, if the RLC status report is not received) after the AM bearers transmit data to a transmitting end, the AM bearers are unable to continue to transmit data thereafter.

In addition, in order to facilitate reception of downlink data from the source base station (or the target base station) or facilitate the source base station (or the target base station) to transmit downlink data, continuous transmission of HARQ ACK or HARQ NACK information or PDCP control data (for example, a PDCP status report or ROHC feedback information) may be allowed through the protocol entities of the first bearer (or the second bearer).

Specifically, in the case where handover corresponding to the 5-2$^{nd}$ embodiment of the disclosure is indicated when receiving handover command message, the terminal may perform scheduling request through the first protocol entity until the second condition is satisfied, may transmit a buffer status report to the source base station, may receive an uplink transmission resource, may transmit uplink data, and may receive downlink data from the source base station.

However, if the second condition is satisfied, the terminal may no longer transmit data to the source base station, may switch the uplink to perform scheduling request through the second protocol entity, may transmit a buffer status report to the target base station, may receive an uplink transmission resource, and may transmit uplink data to the target base station.

However, the terminal may continue to receive downlink data from the source base station, and may continue to transmit HARQ ACK, HARQ NACK, an RLC status report, or PDCP control data (for example, a PDCP status report or ROHC feedback information) corresponding to the downlink data. The terminal may also receive downlink data from the target base station when the second condition is satisfied.

In the 5-2$^{nd}$ embodiment, in step 1004, the terminal 1020 may stop receiving downlink data from the source base station 1005 through the protocol entities 1022 of the first bearer if a first condition is satisfied. In addition, the PDCP entity 1021 of the second bearer may continue to perform the seamless transmission and reception of data to and from the target base station using information such as transmission/reception data, serial number information, header compression and decompression contexts, or the like, which are stored in the PDCP entity 1022 of the first bearer. The first condition may include one of the following conditions.

When the terminal performs a procedure of random access to the target base station through the entities 1021 of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource the source base station may determine the time to stop transmitting the downlink data to the terminal or the time to release the connection with the terminal, based on a predetermined method when performing the efficient handover proposed in the disclosure. For example, the predetermined method may include at least one of when a predetermined timer expires (the timer may start after indication of handover) or when an indication indicating that the terminal has successfully performed the handover to the target base station is received from the target base station.

In addition, if no downlink data is received from the source base station for a predetermined period of time, the terminal may determine that the connection with the source base station is released, and may release the connection.

When the terminal receives, from the target base station, an indication {e.g., an RRC message (e.g., an "RRCReconfiguration" message), a MAC CE, an RLC control PDU, or a PDCP control PDU} to release the connection with the source base station when the terminal receives, from the source base station, an indication {e.g., an RRC message (e.g., an "RRCReconfiguration" message), a MAC CE, an RLC control PDU, or a PDCP control PDU} to release the connection with the source base station when the terminal fails to receive downlink data from the source base station for a predetermined period of time when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated}
    the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the first condition is satisfied.
If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)
    the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the first condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the first condition is satisfied.
In the case where a handover method that does not require a random access procedure (RACH-less handover) is indicated by the handover command message received by the terminal
if the handover command message includes an uplink transmission resource to the target base station
    the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.
In the case where the handover command message does not include an uplink transmission resource for the target base station
    when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfigurationComplete" message) using the uplink transmission resource and receives a UE identity confirmation MAC CE from the base station, the terminal may determine that the random access procedure is successfully completed, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

Meanwhile, the indicators for the embodiments proposed by the disclosure may be defined. Thus, when transmitting the handover command message to the terminal (620) in FIG. 6 as described above, the base station may indicate, to the terminal, the handover procedure corresponding to a specific embodiment to be triggered through the handover command message (e.g., an RRCReconfiguration message). In addition, the terminal may perform a handover procedure according to the handover method indicated by the handover command message, thereby performing handover to the target base station while minimizing data interruption time.

As another method, the indicators for the embodiments proposed by the disclosure may be defined for respective bearers. Thus, the base station may indicate more specifically the embodiment and the bearer to which handover is applied using the handover command message. For example, the embodiments may be applied only to an AM bearer in which an RLC entity is driven in an AM, or may be extendedly applied to a UM bearer in which an RLC entity is driven in a UM.

In addition, it is assumed that the embodiments proposed in the disclosure are applied to the DRBs. However, if necessary (for example, when the terminal maintains an SRB for the source base station and fails to perform handover to the target base station, thereby reporting a handover failure message or recovering the same through the SRB for the source base station), the embodiments proposed in the disclosure may be extendedly applied to the SRB.

In the embodiments, when the terminal transmits and receives data to and from the source base station through the protocol entities of the first bearer, and when the terminal transmits and receives data to and from the target base station through the protocol entities of the second bearer, the MAC entity of the first bearer and the MAC entity of the second bearer may reduce battery consumption of the terminal using separate discontinuous reception (DRX) periods. That is, the terminal may continue to apply the DRX period of the MAC entity, which has been applied when transmitting and receiving data through the protocol entities of the first bearer, even after receiving a handover command message, and may stop the DRX according to the first condition or the second condition in the disclosure. In addition, the terminal may separately apply the DRX period to the MAC entity of the second bearer according to the indication of the target base station.

In addition, in the disclosure, the operation in which the terminal stops uplink transmission to the source base station through the protocol entities of the first bearer and stops downlink transmission from the source base station refers to the operation in which the terminal re-establishes, initializes, or releases the protocol entities of the first bearer (PHY entities, MAC entities, RLC entities, or PDCP entities).

For the convenience of description, it has been described that the terminal has the first bearer for the source base station or the second bearer for the target base station in the above embodiments, and the embodiments may be readily extended and applied, in the same manner, to the case where the terminal has a plurality of first bearers for the source base station or a plurality of second bearers for the target base station.

In addition, the embodiments of the disclosure may be readily extended and applied, in the same manner, to the case where a plurality of bearers is configured for a plurality of target base stations. For example, the terminal may configure second bearers while performing a handover procedure to a first target base station, and if the handover is unsuccessful, the terminal may configure second bearers while performing a handover procedure to a second target base station. As described above, the terminal may search for and determine a cell that satisfies a predetermined condition (for example, a predetermined signal strength or more) among the plurality of target base stations, thereby performing the handover procedure.

Figure 11:
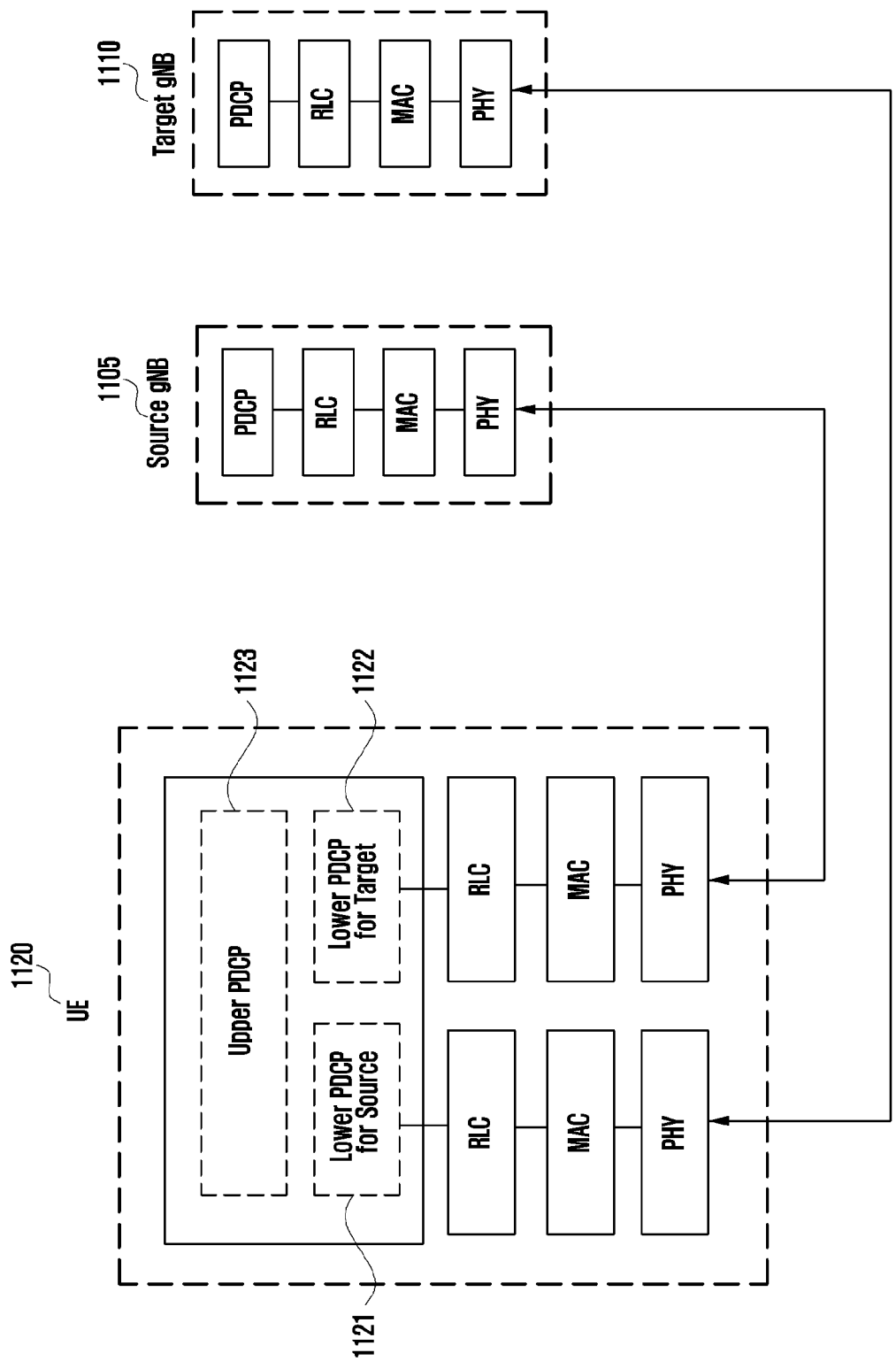
FIG. 11 is a diagram illustrating the structure of an efficient PDCP entity that may be applied to the embodiments.

FIG. 11 is a diagram showing the structure of an efficient PDCP entity that may be applied to embodiments.

The disclosure proposes the structure of an efficient PDCP entity as shown in FIG. 11. The structure of the PDCP entity shown in FIG. 11 may be applied to the second embodiment, the third embodiment, the fourth embodiment, or the fifth embodiment of the efficient handover method for minimizing data interruption time proposed in the disclosure.

In FIG. 11, the terminal 1120 may transmit and receive data to and from a source base station 1105 through protocol entities of a first bearer, and may transmit and receive data to and from a target base station 1110 through protocol entities of a second bearer at the same time.

Although a PDCP entity of the first bearer and a PDCP entity of the second bearer are configured in the terminal, respectively, the PDCP entity of the first bearer and the PDCP entity of the second bearer may logically operate as a single PDCP entity as shown in FIG. 11. Specifically, the single PDCP entity may be implemented to have an upper PDCP entity 1123 and two lower PDCP entities 1121 and 1122 for the source base station and the target base station, respectively, according to functions of the PDCP entity.

The upper transmitting PDCP entity 1123 may serve to assign PDCP serial numbers to data received from an upper layer entity. In addition, the upper transmitting PDCP entity 1123 may perform header compression. In addition, the lower transmitting PDCP entities 1121 and 1122 for the source base station and the target base station may apply an integrity protection procedure to the PDCP header and data (PDCP SDUs), in the case where integrity protection is configured using separate security keys set for the source base station and the target base station, may apply a ciphering procedure to the PDCP header and data, and may transmit the same to a transmitting RLC entity of the first bearer or a transmitting RLC entity of the second bearer.

In order to accelerate a data processing rate, the lower transmitting PDCP entities 1121 and 1122 may perform parallel processing in which header compression, integrity protection, and/or ciphering procedures are performed in parallel, and may perform the integrity protection or ciphering procedure using different security keys. In addition, the integrity protection or ciphering procedure may be performed on different data in logically one transmitting PDCP entity using different security keys or security algorithms.

The upper receiving PDCP entity 1123 may perform a duplicate detection function on the data received from lower layer entities, based on PDCP serial numbers. In addition, the upper receiving PDCP entity 1123 may sort the received data in ascending order of the PDCP serial numbers, and may transmit the same to the upper layer in sequence. In addition, the upper receiving PDCP entity 1123 may perform header decompression.

Further, the lower receiving PDCP entities 1121 and 1122 for respective ones of the source base station and the target base station may apply an integrity verification procedure to the PDCP header and data (PDCP SDUs), in the case where integrity protection is configured using separate security keys set for the source base station and the target base station, may apply a deciphering procedure to the PDCP header and data, and may transmit the same to the upper receiving PDCP entity, thereby processing the data.

In order to reduce unnecessary integrity verification or deciphering procedures, the lower receiving PDCP entities may perform a procedure of discarding data outside the window and discarding duplicate data, based on the PDCP serial numbers, and may perform the integrity verification or deciphering procedure only on the valid data inside the window.

In order to accelerate a data processing rate, the lower transmitting PDCP entities may perform parallel processing in which header compression, integrity protection, and ciphering procedures are performed in parallel, based on the PDCP serial numbers, and may perform the integrity protection verification or deciphering procedure using different security keys. In addition, the integrity protection or ciphering procedure may be performed on different data in logically one transmitting PDCP entity using different security keys or security algorithms. Further, the lower receiving PDCP entities may perform an out-of-sequence deciphering or integrity verification procedure for each piece of data received regardless of the sequence of the PDCP serial numbers.

The entities of the first bearer (or a first RLC entity) and the entities of the second bearer (or a second RLC entity) for a single PDCP entity are distinguished by considering that they are connected to different MAC entities, by allowing them to have different logical channel identifiers, by considering that they are different RLC entities connected to different MAC entities, or based on that they use different ciphering keys, and uplink data and downlink data may be ciphered or deciphered using different security keys, and may be compressed or decompressed using different compression protocol contexts.

When the fourth or fifth embodiment proposed in the disclosure may be indicated to the terminal through a handover command message. At this time, if a fourth condition below is satisfied for each bearer, the terminal may convert, change, or reset the PDCP entity, which is used for each bearer before the handover command message is received, into the efficient PDCP entity proposed in FIG. 11, and may apply the same. The fourth condition may be one or more of the following conditions.

In the case where the terminal receives, from the source base station, a handover command message that indicates to perform handover using the fourth or fifth embodiment proposed in the disclosure or indicates the method of applying the efficient PDCP entity structure proposed in FIG. 11 when the terminal performs a procedure of random access to the target base station through the entities 1021 of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the fourth condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the fourth condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the fourth condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the fourth condition is satisfied. As another method, when the terminal receives a first uplink transmission resource through a PDCCH corresponding to a C-RNTI of the terminal by monitoring the PDCCH after a random access procedure is successfully completed, the terminal may determine that the fourth condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the fourth condition is satisfied. As another method, when the terminal receives a first uplink transmission resource through a PDCCH corresponding to a C-RNTI of the terminal by monitoring the PDCCH after a random access procedure is successfully completed, the terminal may determine that the fourth condition is satisfied.

In addition, when the fourth or fifth embodiment proposed in the disclosure is indicated to the terminal by a handover command message, if the fourth condition is satisfied for each bearer, the terminal may convert, change, or reset the PDCP entity, which is used for each bearer before the handover command message is received, into the efficient PDCP entity proposed in FIG. 11, and may apply the same.

Further, if a fifth condition is satisfied, the terminal may stop receiving downlink data from the source base station, and may reconvert, re-change, or reset the structure of the PDCP entity, which has been converted, changed, or reset into the efficient PDCP entity proposed in FIG. 11, into the PDCP entity used for each bearer before the handover command message is received. The fifth condition may be one or more of the following conditions.

- When the terminal performs a procedure of random access to the target base station through the entities 1021 of the second bearer and receives a random access response
- when the terminal performs a procedure of random access to the target base station through the entities of the second bearer, receives a random access response, and configures and transmits a handover completion message to the target base station
- when the terminal completes a procedure of random access to the target base station through the entities of the second bearer and initially transmits data using a PUCCH or PUSCH uplink transmission resource
- when the base station configures a separate timer for the terminal through an RRC message and the timer expires
  the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.
- when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)
- when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource
- when the terminal receives, from the target base station, an indication {e.g., an RRC message (e.g., an "RRCReconfiguration" message), a MAC CE, an RLC control PDU, or a PDCP control PDU} to release the connection with the source base station
- when the terminal receives, from the source base station, an indication {e.g., an RRC message (e.g., an "RRCReconfiguration" message), a MAC CE, an RLC control PDU, or a PDCP control PDU} to release the connection with the source base station
- when the terminal fails to receive downlink data from the source base station for a predetermined period of time
- when the terminal successfully completes a procedure of random access to the target base station through the entities of the second bearer, and receives a first uplink transmission resource allocated by the target base station, or receives an indication of a first uplink transmission resource
- for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated}
  the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the fifth condition is satisfied.
- If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated}
  the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the fifth condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the fifth condition is satisfied.
- In the case where a handover method that does not require a random access procedure (RACH-less handover) is indicated by the handover command message received by the terminal
- if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the fifth condition is satisfied. As another method, when the terminal receives a first uplink transmission resource through a PDCCH corresponding to a C-RNTI of the terminal by monitoring the PDCCH after a random access procedure is successfully completed, the terminal may determine that the fifth condition is satisfied.

In the case where the handover command message does not include an uplink transmission resource for the target base station
when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the fifth condition is satisfied. As another method, when the terminal receives a first uplink transmission resource through a PDCCH corresponding to a C-RNTI of the terminal by monitoring the PDCCH after a random access procedure is successfully completed, the terminal may determine that the fifth condition is satisfied.

As another method, if the fifth condition is satisfied, the terminal may stop receiving downlink data from the source base station, may release the RLC entity or the MAC entity, which is the first protocol entity, for each bearer, and may apply the structure of the efficient PDCP entity proposed in FIG. 11 to respective bearers, thereby using the same.

Figure 12:
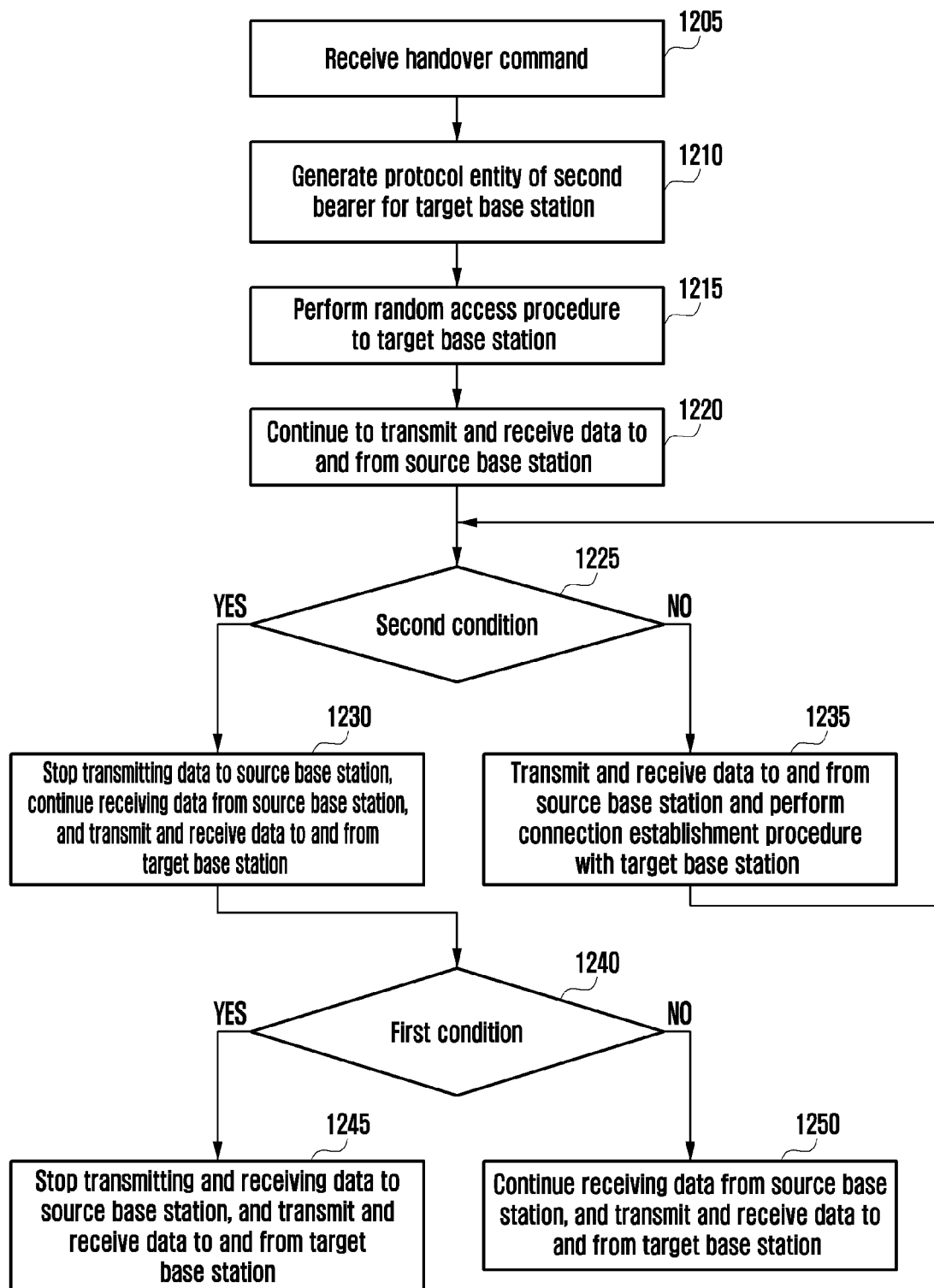
FIG. 12 is a diagram illustrating the operation of a terminal that may be applied to the embodiments proposed in the disclosure.

FIG. 12 is a display illustrating the operation of a terminal that may be applied to the embodiments proposed in the disclosure.

Referring to FIG. 12, a terminal may receive a handover command message (1205). The terminal may establish protocol entities of a second bearer for a target base station indicated by the message (1210).

Then, the terminal may perform a procedure of random access to the target base station through the established protocol entities (1215). The terminal may continue to transmit and receive data to and from a source base station (uplink data transmission and downlink data transmission) through protocol entities of a first bearer while performing the random access procedure (1220).

The terminal may identify whether or not a second condition is satisfied (1225), and if the second condition is satisfied, the terminal may stop transmitting uplink data to the source base station through the protocol entities of the first bearer, and may transmit uplink data to the target base station through the protocol entities of the second bearer while continuing to receive downlink data from the source base station and the target base station through the protocol entities of the first bearer and the second bearer (1230). In addition, the PDCP entity of the second bearer may continue to perform the seamless transmission and reception of data to and from the target base station using information such as transmission/reception data, serial number information, header compression and decompression contexts, or the like, which are stored in the PDCP entity of the first bearer. The second condition may be one of the following conditions.

When the terminal performs a procedure of random access to the target base station through the entities of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource when the terminal receives, from the target base station, an indication {e.g., an RRC message (e.g., an "RRCReconfiguration" message), a MAC CE, an RLC control PDU, or a PDCP control PDU} to release the connection with the source base station and to switch the uplink to the target base station when the terminal receives, from the source base station, an indication {e.g., an RRC message (e.g., an "RRCReconfiguration" message), a MAC CE, an RLC control PDU, or a PDCP control PDU} to release the connection with the source base station and to switch the uplink to the target base station in the case where the terminal receives, from the source base station, a handover command message that indicates to perform handover using the fourth or fifth embodiment proposed in the disclosure or indicates the method of applying an efficient PDCP entity structure proposed in FIG. 11 when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the second condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated} the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the second condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the second condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the second condition is satisfied. As another method, when the terminal receives a first uplink transmission resource through a PDCCH corresponding to a C-RNTI of the terminal by monitoring the PDCCH after a random access procedure is successfully completed, the terminal may determine that the second condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfigurationComplete" message) using the uplink transmission resource and receives a UE identity confirmation MAC CE from the base station, the terminal may determine that the random access procedure is successfully completed, thereby determining that the second condition is satisfied. As another method, when the terminal receives a first uplink transmission resource through a PDCCH corresponding to a C-RNTI of the terminal by monitoring the PDCCH after a random access procedure is successfully completed, the terminal may determine that the second condition is satisfied.

If the second condition is not satisfied in the above step, the terminal may repeat to check the second condition while continuing the existing procedure (that is, the procedure of transmitting and receiving data to and from the source base station and connecting to the target base station) (1235).

Meanwhile, if a first condition is satisfied (1240), the terminal may stop receiving downlink data from the source base station through the protocol entities of the first bearer (1245). In addition, the PDCP entity of the second bearer may continue to perform the seamless transmission and reception of data to and from the target base station using information such as transmission/reception data, serial number information, header compression and decompression contexts, or the like, which are stored in the PDCP entity of the first bearer. The first condition may be one of the following conditions.

When the terminal performs a procedure of random access to the target base station through the entities of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource the source base station may determine the time to stop transmitting the downlink data to the terminal or the time to release the connection with the terminal, based on a predetermined method when performing the efficient handover proposed in the disclosure. For example, the predetermined method may include at least one of when a predetermined timer expires (the timer may start after indication of handover) or when an indication indicating that the terminal has successfully performed the handover to the target base station is received from the target base station. In addition, if no downlink data is received from the source base station for a predetermined period of time, the terminal may determine that the connection with the source base station is released, and may release the connection.

When the terminal receives, from the target base station, an indication {e.g., an RRC message (e.g., an "RRCReconfiguration" message), a MAC CE, an RLC control PDU, or a PDCP control PDU} to release the connection with the source base station when the terminal receives, from the source base station, an indication {e.g., an RRC message (e.g., an "RRCReconfiguration" message), a MAC CE, an RLC control PDU, or a PDCP control PDU} to release the connection with the source base station when the terminal fails to receive downlink data from the source base station for a predetermined period of time when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the first condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the first condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the first condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the first condition is satisfied. As another method, when the terminal receives a first uplink transmission resource through a PDCCH corresponding to a C-RNTI of the terminal by monitoring the PDCCH after a random access procedure is successfully completed, the terminal may determine that the first condition is satisfied.

If the first condition is not satisfied in the above step, the terminal may repeat to check the first condition while continuing the existing procedure (1250).

In the disclosure, the operation of the PDCP entity is used to prevent the occurrence of data interruption time and data loss when performing the embodiments of handover procedures for minimizing the data interruption time (the first embodiment, the second embodiment, the third embodiment, the fourth embodiment, the fifth embodiment, or the 5-$2^{nd}$ embodiment), which are proposed in the disclosure. Therefore, hereinafter, the disclosure proposes embodiments of a PDCP entity procedure supporting the handover procedure in order to minimize data interruption time.

The indicators for the respective embodiments of the handover procedure for minimizing data interruption time proposed in the disclosure may be defined. Therefore, the embodiments of the PDCP entity procedure supporting the handover procedure for minimizing data interruption time according to the disclosure may indicate, to the terminal, the handover procedure corresponding to a specific embodiment to be triggered using the handover command message (e.g., an RRCReconfiguration message) when the base station transmits a handover command message to the terminal (620) in FIG. 6. Thus, the terminal may perform a handover procedure according to the handover method indicated by the handover command message, thereby performing handover to the target base station while minimizing the data interruption time.

In addition, the indicators for the embodiments of PDCP entity procedures in the handover procedure for minimizing the data interruption time proposed in the disclosure may be defined for each bearer or for each PDCP entity. Therefore, the base station may indicate, to the terminal, the PDCP entity procedure corresponding to a specific embodiment to be triggered using a handover command message (e.g., an RRCReconfiguration message), so that the terminal may perform the indicated PDCP entity procedure.

Hereinafter, the disclosure proposes a first embodiment of the PDCP entity procedure supporting a handover procedure for minimizing data interruption time proposed in the disclosure.

In the first embodiment of the PDCP entity procedure proposed in the disclosure, the specific operation of a transmitting PDCP entity and a receiving PDCP entity are as follows. The first embodiment may be referred to as "PDCP re-establishment".

If an upper layer entity (e.g., an RRC entity) requests the first embodiment of the PDCP entity procedure for a certain bearer, or if the first embodiment of the PDCP entity procedure is indicated by an indicator when the terminal receives a handover command message or an "RRCReconfiguration" message, the transmitting PDCP entity may perform at least one of the following procedures.

1. If there is no indicator for UM DRBs and AM DRBs to continue using the header compression protocol, the transmitting PDCP entity may initialize the header compression protocol and starts the same in a unidirectional (U) mode of an initialized and refreshed (IR) state.

2. The transmitting PDCP entity sets window state variables (e.g., TX_NEXT) of UM DRBs and SRBs to initial values.

3. As to SRBs, the transmitting PDCP entity discards all of the stored data (e.g., PDCP SDUs or PDCP PDUs) (since the data is RRC messages produced to be transmitted to the source base station, they are discarded to avoid transmitting the same to the target base station).

4. The transmitting PDCP entity applies a new security key and a new ciphering algorithm received from an upper layer entity (e.g., an RRC entity).

5. The transmitting PDCP entity applies a new security key and a new integrity protection algorithm received from an upper layer entity (e.g., an RRC entity).

6. As to UM DRBs, the transmitting PDCP entity regards the data (e.g., PDCP SDUs), which has not been transmitted to a lower layer entity even though the PDCP serial numbers have already been assigned thereto (after discarding all of the existing stored PDCP PDUs), as the data received from an upper layer (e.g., an SDAP entity or a TCP/IP entity), and transmits data in the ascending order of COUNT values (or PDCP serial numbers) allocated before the re-establishment of the PDCP. In addition, the transmitting PDCP entity does not restart a data discard timer. Specifically, the transmitting PDCP entity performs a new header compression procedure on the data (PDCP SDUs), performs again an integrity procedure or a ciphering procedure, configures a PDCP header, and transmits the same to a lower layer entity.

7. As to AM DRBs, the transmitting PDCP entity may perform (after discarding all of the existing stored PDCP PDUs) a new header compression procedure on the data, in the ascending order of COUNT values (or PDCP serial numbers) allocated before the re-establishment of the PDCP, from the first data (e.g., PDCP SDUs) of which the successful delivery has not been confirmed by lower layer entities (e.g., RLC entities), may perform again an integrity procedure or a ciphering procedure, configures a PDCP header, and may transmit the same to a lower layer entity, thereby performing retransmission or transmission. In other words, the transmitting PDCP entity performs retransmission by accumulating data from the first data of which the successful delivery has not been confirmed.

If an upper layer entity (e.g., an RRC entity) requests the first embodiment of the PDCP entity procedure for a certain bearer, or if the first embodiment of the PDCP entity procedure is indicated when the terminal receives a handover command message or an RRC Reconfiguration message, the receiving PDCP entity may perform the following procedures.

1. The receiving PDCP entity processes the data (e.g., PDCP PDUs) received from a lower layer entity due to the re-establishment of the lower layer entities (e.g., RLC entities).

2. As to SRBs, the receiving PDCP entity discards all of the stored data (e.g., PDCP SDUs or PDCP PDUs) (since the data is the RRC messages received from the source base station, the receiving PDCP entity discards the date).

3. If a reordering timer is running for SRBs and UM DRBs, the receiving PDCP entity may stop and reset the timer. In addition, the receiving PDCP entity may perform a header decompression procedure on all of the stored data (e.g., PDCP SDUs) for the UM DRBs, and transmits the same to an upper layer entity.

4. If there is no indicator to continue using the header decompression protocol for AM DRBs, the receiving PDCP entity performs a header decompression procedure on the stored data (e.g., PDCP SDUs).

5. If there is no indicator to continue using the header decompression protocol for UM DRBs and AM DRBs, the receiving PDCP entity initializes the downlink header decompression protocol and starts the same in a unidirectional (U) mode of a no context (NC) state.

6. The receiving PDCP entity sets window variables (e.g., RX_NEXT and RX_DELIV) of UM DRBs and SRBs to initial values.

7. The receiving PDCP entity applies a new security key and a new ciphering/deciphering algorithm received from an upper layer entity (e.g., an RRC entity).

8. The receiving PDCP entity applies a new security key and a new integrity protection/verification algorithm received from an upper layer entity (e.g., an RRC entity).

Hereinafter, the disclosure proposes a second embodiment of the PDCP entity procedure supporting the handover procedure for minimizing data interruption time proposed in the disclosure.

In the second embodiment of the PDCP entity procedure proposed in the disclosure, the specific operation of a transmitting PDCP entity and a receiving PDCP entity are as follows. The second embodiment may be referred to as "PDCP data recovery".

If an upper layer entity (e.g., an RRC entity) requests the second embodiment of the PDCP entity procedure for a certain bearer, or if the second embodiment of the PDCP entity procedure is indicated by an indicator when the terminal receives a handover command message or an "RRCReconfiguration" message, the transmitting PDCP entity may perform at least one of the following procedures.

1. If an upper layer entity (e.g., an RRC entity) requests a PDCP data recovery procedure for AM DRBs, the transmitting PDCP entity may perform the following procedure.

A. The transmitting PDCP entity may perform selective retransmission only on all of the data of which the successful transmission (RLC ACK) has not been confirmed by lower layer entities (e.g., RLC entities), among the data (e.g., PDCP PDUs) previously transmitted to a re-established AM RLC entity or a disconnected AM RLC entity, in the ascending order of COUNT values (or PDCP serial numbers). The transmission and retransmission may be performed on the data previously stored in a buffer, or in the case of data that has not been generated, the data may be generated, and then transmission and retransmission may be performed on the generated data.

Hereinafter, the disclosure proposes a third embodiment of the PDCP entity procedure supporting the handover procedure for minimizing data interruption time proposed in the disclosure.

In the third embodiment of the PDCP entity procedure proposed in the disclosure, the specific operation of a transmitting PDCP entity and a receiving PDCP entity are as follows. The third embodiment may be referred to as "PDCP continuation" or another name. In addition, the third embodiment may be configured as a 3-$1^{st}$ embodiment and a 3-$2^{nd}$ embodiment.

If an upper layer entity (e.g., an RRC entity) requests a 3-$1^{st}$ embodiment of a PDCP entity procedure for a certain bearer, or if a 3-$1^{st}$ embodiment of a PDCP entity procedure is indicated by an indicator when a terminal receives a handover command message or an "RRCReconfiguration" message, the transmitting PDCP entity may perform one or more of a plurality of procedures below.

As another method, if the handover command message contains an indicator indicating the fourth embodiment or the fifth embodiment proposed in the disclosure to handover, the transmitting PDCP entity may perform one or more of a plurality of procedures in the 3-$1^{st}$ embodiment below.

1. If there is no indicator to continue to use the header compression protocol for UM DRBs and AM DRBs, the transmitting PDCP entity initializes the header compression protocol and starts the same in a unidirectional (U) mode of an initialized and refreshed (IR) state.

2. Since the transmission of data to the source base station and the target base station continues to be performed in order to minimize data interruption time, the transmitting PDCP entity does not initialize window variables (e.g., TX_NEXT) for UM DRBs.

3. If a handover command message is received from the source base station, since the terminal no longer transmits and receives the RRC messages to and from the source base station, the terminal may set window state variables (e.g., TX_NEXT) of the SRBs to initial values. Alternatively, the terminal may release the SRBs for the source base station. In addition, the terminal may also set window state variables (e.g., TX_NEXT) to initial values for the SRBs of the second bearer of the target base station.

As another method, if the terminal fails to perform handover to the target base station, the terminal may transmit a handover failure message, an RRC connection re-establishment message, or an RRC connection recovery request message through the SRB of the source base station while maintaining a SRB connection with the source base station, thereby reducing the transmission delay due to the failure of handover. As another method, when maintaining the SRB connection with the source base station above, the terminal may discard the data (PDCP SDUs or PDCP PDUs) stored in the SRB, and may set a window state variable thereof (e.g., TX_NEXT) to an initial value, thereby preventing the occurrence of a gap of PDCP serial numbers when transmitting a handover failure message, an RRC connection re-establishment message, or an RRC connection recovery message through the SRB of the source base station later.

4. If a handover command message is received from the source base station, the terminal may discard all of the stored data (e.g., PDCP SDUs or PDCP PDUs) for SRBs because RRC messages need no longer to be transmitted to and received from the source base station (since the data is RRC messages produced and intended to be transmitted to the source base station, the terminal discards the data in order to avoid transmitting the same to the target base station).

5. The transmitting PDCP entity may store and prepare a new security key and a new ciphering algorithm received from an upper layer entity (e.g., an RRC entity), and may apply the same to a PDCP entity of the second bearer for the target base station and to data. In addition, the transmitting PDCP entity may continue to apply the old security key and ciphering algorithm, used before receiving the new security key and ciphering algorithm from the upper layer entity, to the PDCP entity of the first bearer for the source base station and to data.

6. The transmitting PDCP entity may store and prepare a new security key and a new integrity protection algorithm received from an upper layer entity (e.g., an RRC entity), and may apply the same to the PDCP entity of the second bearer for the target base station and to data. In addition, the transmitting PDCP entity may continue to apply the security key and integrity protection algorithm, used before receiving the new security key and integrity protection algorithm from the upper layer entity, to the PDCP entity of the first bearer for the source base station and to data.

7. The transmitting PDCP entity may transmit a PDCP status report to the source base station, thereby reporting the current transmission/reception state of data (e.g., successful or unsuccessful reception of data), when it is necessary, configured, or indicated, or at all times.

8. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. As another method, if there is no indicator to continue using the buffer content for the user data compression procedure, the terminal may initialize the buffer. As another method, if dictionary information is predefined, the buffer may be initialized using the dictionary information. In addition, the terminal may apply user data compression configuration for the target base station, and may initialize the buffer.

If an upper layer entity (for example, an RRC entity) requests a 3-$1^{st}$ embodiment of a PDCP entity procedure for a certain bearer, or if a 3-$1^{st}$ embodiment of a PDCP entity procedure is indicated by an indicator when a terminal receives a handover command message or an RRC Reconfiguration message, the receiving PDCP entity may perform one or more of the following procedures.

As another method, if the handover command message contains an indicator indicating the fourth embodiment or the fifth embodiment proposed in the disclosure to handover, the receiving PDCP entity may perform one or more of a plurality of procedures in the 3-$1^{st}$ embodiment below.

1. If a handover command message is received from the source base station, since the terminal no longer transmits and receives the RRC messages to and from the source base station, the terminal may discard all of the stored data (e.g., PDCP SDUs or PDCP PDUs) for SRBs (the data is discarded because the data is the RRC messages received from the source base station).

In addition, the terminal may stop the reordering timer if the reordering timer is running. Alternatively, the terminal may release SRBs for the source base station. In addition, the terminal may set window variables (e.g., RX_NEXT and RX_DELIV) to initial values for SRBs of the second bearer for the target base station, and may stop the reordering timer if the reordering timer is running.

As another method, if the terminal fails to perform handover to the target base station, the terminal may transmit a handover failure message, an RRC connection re-establishment message, or an RRC connection recovery request message through the SRB of the source base station while maintaining a SRB connection with the source base station, thereby reducing the transmission delay due to the failure of handover. As another method, when maintaining the SRB connection with the source base station above, the terminal may discard the data (PDCP SDUs or PDCP PDUs) stored in the SRB, and may set window state variables (e.g., RX_NEXT) to initial values, thereby preventing the occurrence of a gap of PDCP serial numbers when transmitting a handover failure message, an RRC connection re-establishment message, or an RRC connection recovery message to the SRB of the source base station later.

2. Since data continues to be received from the source base station or the target base station without interruption of transmission and reception of data, a separate process on the stored data for UM DRBs is not required.

3. If a reordering timer is running for SRBs and UM DRBs, the receiving PDCP entity stops and resets the timer, performs a header decompression procedure on all of the stored data (e.g., PDCP SDUs) for the UM DRBs, and transmits the same to an upper layer entity.

4. If there is no indicator to continue using the header decompression protocol for AM DRBs, the receiving PDCP entity performs a header decompression procedure on the stored data (e.g., PDCP SDUs).

5. If there is no indicator to continue using the header decompression protocol for UM DRBs and AM DRBs, the receiving PDCP entity initializes downlink header decompression protocol and starts in a unidirectional (U) mode of a no context (NC) state.

6. Since data continues to be received from the source base station or the target base station without interruption of transmission and reception of data, the receiving PDCP entity does not set window state variables (e.g., RX_NEXT and RX_DELIV) to initial values for UM DRBs.

7. The receiving PDCP entity may store and prepare a new security key and a new ciphering algorithm received from an upper layer entity (e.g., an RRC entity), and may apply the same to the PDCP entity of the second bearer for the target base station and to data. In addition, the receiving PDCP entity may continue to apply the security key and ciphering algorithm, used before receiving the new security key and ciphering algorithm from the upper layer entity, to the PDCP entity of the first bearer for the source base station and to data.

8. The receiving PDCP entity may store and prepare a new security key and a new integrity protection algorithm received from an upper layer entity (e.g., an RRC entity), and may apply the same to the PDCP entity of the second bearer for the target base station and to data. In addition, the receiving PDCP entity may continue to apply the security key and integrity protection algorithm, used before receiving the new security key and integrity protection algorithm from the upper layer entity, to the PDCP entity of the first bearer for the source base station and to data.

9. Upon receiving a PDCP status report, the receiving PDCP entity may read the current state of transmitting and receiving data to and from the source base station or the target base station (e.g., successful or unsuccessful reception of data), and may reflect the same to the transmission or retransmission of data. For example, the receiving PDCP entity may not perform transmission or retransmission on the data of which the successful delivery is confirmed.

10. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. As another method, if there is no indicator to continue using the buffer content for the user data compression procedure, the terminal may initialize the buffer. As another method, if dictionary information is predefined, the buffer may be initialized using the dictionary information. In addition, the terminal may apply user data compression configuration for the target base station, and may initialize the buffer.

If an upper layer entity (for example, an RRC entity) requests a 3-$2^{nd}$ embodiment of a PDCP entity procedure for a certain bearer, or if a third condition is satisfied, the transmitting PDCP entity of the terminal may perform the 3-$2^{nd}$ embodiment and specifically, perform one or more of a plurality of procedures below.

1. The transmitting PDCP entity may apply a new security key and a new ciphering algorithm, which are received from an upper layer entity (e.g., an RRC entity) and stored, to a PDCP entity of the second bearer for the target base station and to data. In addition, the transmitting PDCP entity may release or discard the security key and ciphering algorithm applied to the PDCP entity of the first bearer for the source base station before receiving the new security key and ciphering algorithm from the upper layer entity.

As another method, the transmitting PDCP entity may release the security key and ciphering algorithm applied to the PDCP entity of the first bearer for the source base station in the uplink, and may maintain and apply the same to the data received in the downlink. As another method, the transmitting PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

2. The transmitting PDCP entity may apply a new security key and integrity verification algorithm, which are received from an upper layer entity (e.g., an RRC entity) and stored, to the PDCP entity of the second bearer for the target base station and to data. In addition, the transmitting PDCP entity may release or discard the security key and ciphering algorithm applied to the PDCP entity of the first bearer for the source base station before receiving the new security key and integrity verification algorithm from the upper layer entity.

As another method, the transmitting PDCP entity may release the security key and ciphering algorithm applied to the PDCP entity of the first bearer for the source base station in the uplink, and may maintain and apply the same to the data received in the downlink. As another method, the transmitting PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

3. The transmitting PDCP entity may transmit a PDCP status report to the source base station or the target base station, thereby reporting the current transmission/reception state of data (e.g., successful or unsuccessful reception of data), when it is necessary, configured, or indicated, or at all times.

4. As to UM DRBs, the transmitting PDCP entity regards the data (e.g., PDCP SDUs), which has not been transmitted to a lower layer entity even though the PDCP serial numbers have already been assigned thereto (after discarding all of the existing stored PDCP PDUs), as the data received from an upper layer (e.g., an SDAP entity or a TCP/IP entity), and transmits data in the ascending order of COUNT values (or PDCP serial numbers) allocated before the re-establishment of the PDCP. In addition, the terminal does not restart a data discard timer. Specifically, the transmitting PDCP entity performs a new header compression procedure on the data (PDCP SDUs), performs again an integrity procedure or a ciphering procedure, configures a PDCP header, and transmits the same to a lower layer entity.

5. As to AM DRBs, the transmitting PDCP entity may perform (after discarding all of the existing stored PDCP PDUs) a new header compression procedure on the data, in the ascending order of COUNT values (or PDCP serial numbers) allocated before the re-establishment of the PDCP (or before the third condition is satisfied or before the RRC message is received), from the first data (e.g., PDCP SDUs) of which the successful delivery has not been confirmed by lower layer entities (e.g., RLC entities). In addition, the transmitting PDCP entity may perform again an integrity procedure or a ciphering procedure, configures a PDCP header, and may transmit the same to a lower layer entity, thereby performing retransmission or transmission. That is, the transmitting PDCP entity performs retransmission by accumulating data from the first data of which the successful delivery has not been confirmed.

As another method, the transmitting PDCP entity may perform retransmission only on the data of which the successful delivery has not been confirmed by lower layer entities (e.g., RLC entities) when performing retransmission. More specifically, as to AM DRBs, the transmitting PDCP entity (after discarding all of the PDCP PDUs stored to be transmitted to the source base station through a first protocol entity previously connected to the PDCP entity) may release the lower layer entities (e.g., an RLC entity or a MAC entity), which are the first protocol entities for transmitting data to the source base station. In addition, the transmitting PDCP entity may performs a new header or data compression procedure from the first data (e.g., PDCP SDUs) of which the successful transmission has not been confirmed by lower layer entities (e.g., RLC entities), which are the first protocol entities for transmitting data to the source base station, in the ascending order of COUNT values (or PDCP serial numbers) allocated before the re-establishment of the PDCP (or before the third condition is satisfied or before the RRC message is received) by applying the security key or the header compression (or data compression) protocol context corresponding to the target base station, may perform the integrity or ciphering procedure again, may configure a PDCP header, and may transmit the PDCP header to the lower layer entity, which is the second protocol entity for transmitting data to the target base station, thereby performing retransmission or transmission. That is, the transmitting PDCP entity may perform retransmission by accumulating data from the first data of which the successful delivery has not been confirmed.

As another method, when performing the retransmission, the transmitting PDCP entity transmits only the data of which the successful delivery has not been confirmed by lower layer entities (e.g., RLC entities), which are the first protocol entities for transmitting data to the source base station, to the lower layer entity, which is the second protocol entity for transmitting data to the target base station, thereby performing selective retransmission. As another method, the transmission or retransmission operation may be performed after releasing the lower layer entities (e.g., RLC entities or MAC entities), which are first protocol entities for transmitting data to the source base station.

6. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. In addition, the terminal may release user data compression configuration for the source base station, and may release the buffer.

If an upper layer entity (for example, an RRC entity) requests a 3-$2^{nd}$ embodiment of a PDCP entity procedure for a certain bearer, or if a third condition is satisfied, the receiving PDCP entity of the terminal may perform the 3-$2^{nd}$ embodiment and specifically, perform one or more of a plurality of procedures below.

1. If there is data (e.g., PDCP PDUs) received from lower layer entities due to re-establishment of lower layer entities (e.g., RLC entities), the receiving PDCP entity processes the data.

2. Since data continues to be received from the source base station or the target base station without interruption of transmission and reception of data, a separate process on the stored data for UM DRBs is not required.

3. Since data continues to be received from the source base station or the target base station without interruption of transmission and reception of data, the receiving PDCP entity does not set window state variables (e.g., RX_NEXT and RX_DELIV) to initial values for AM DRBs or UM DRBs.

4. The receiving PDCP entity may apply a new security key and a new ciphering algorithm, which are received from an upper layer entity (e.g., an RRC entity) and stored, to the PDCP entity of the second bearer for the target base station and to data. In addition, if downlink data is no longer received from the source base station, the receiving PDCP entity may release or discard the security key and ciphering algorithm applied to the PDCP entity of the first bearer for the source base station before receiving the new security key and ciphering algorithm from the upper layer entity.

As another method, the receiving PDCP entity may release the security key and ciphering algorithm applied to the PDCP entity of the first bearer for the source base station in the uplink, and may maintain and apply the same to the data received in the downlink. As another method, the receiving PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

5. The receiving PDCP entity may apply a new security key and a new integrity verification algorithm, which are received from an upper layer entity (e.g., an RRC entity) and stored, to the PDCP entity of the second bearer for the target base station and to data. In addition, if downlink data is no longer received from the source base station, the receiving PDCP entity may release or discard the security key and ciphering algorithm applied to the PDCP entity of the first bearer for the source base station before receiving the new security key and integrity verification algorithm from the upper layer entity.

As another method, the receiving PDCP entity may release the security key and ciphering algorithm applied to the PDCP entity of the first bearer for the source base station in the uplink, and may maintain and apply the same to the data received in the downlink. As another method, the receiving PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

6. Upon receiving a PDCP status report, the receiving PDCP entity may read the current state of transmitting and receiving data to and from the source base station or the target base station (e.g., successful or unsuccessful reception of data), and may reflect the same to the transmission or retransmission of data. For example, the receiving PDCP entity may not perform transmission or retransmission on the data of which the successful delivery is confirmed.

7. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. In addition, the terminal may release user data compression configuration for the source base station, and may release the buffer.

The third condition may be one of the following conditions.

When the terminal performs a procedure of random access to the target base station through the entities of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource when the terminal receives, from the target base station, an indication {e.g., an RRC message (e.g., an "RRCReconfiguration" message), a MAC CE, an RLC control PDU, or a PDCP control PDU} to switch the uplink to the target base station when the terminal receives, from the source base station, an indication {e.g., an RRC message (e.g., an "RRCReconfiguration" message), a MAC CE, an RLC control PDU, or a PDCP control PDU} to switch the uplink to the target base station when the terminal receives, from the target base station, an indication {e.g., an RRC message (e.g., an "RRCReconfiguration" message), a MAC CE, an RLC control PDU, or a PDCP control PDU} to release the connection with the source base station when the terminal receives, from the source base station, an indication {e.g., an RRC message (e.g., an "RRCReconfiguration" message), a MAC CE, an RLC control PDU, or a PDCP control PDU} to release the connection with the source base station when the terminal releases the connection with the source base station and releases first protocol entities when the terminal fails to receive downlink data from the source base station for a predetermined period of time when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the third condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the third condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the third condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the third condition is satisfied. As another method, when the terminal receives a first uplink transmission resource through a PDCCH corresponding to a C-RNTI of the terminal by monitoring the PDCCH after a random access procedure is successfully completed, the terminal may determine that the third condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the third condition is satisfied. As another method, when the terminal receives a first uplink transmission resource through a PDCCH corresponding to a C-RNTI of the terminal by monitoring the PDCCH after a random access procedure is successfully completed, the terminal may determine that the third condition is satisfied.

If the third condition is not satisfied in the above step, the terminal may repeat to check the third condition while continuing the existing procedure.

Hereinafter, the disclosure proposes a fourth embodiment of the PDCP entity procedure supporting the handover procedure for minimizing data interruption time proposed in the disclosure.

In the fourth embodiment of the PDCP entity procedure proposed in the disclosure, the specific operation of a transmitting PDCP entity and a receiving PDCP entity are as follows. The fourth embodiment may be referred to as "PDCP continuation" or another name. In addition, the fourth embodiment may be configured as a $4\text{-}1^{st}$ embodiment and a $4\text{-}2^{nd}$ embodiment. In the fourth embodiment, since data continues to be transmitted and received, a procedure for initializing or handling a header compression protocol is unnecessary.

If an upper layer entity (e.g., an RRC entity) requests a $4\text{-}1^{st}$ embodiment of a PDCP entity procedure for a certain bearer, or if a $4\text{-}1^{st}$ embodiment of a PDCP entity procedure is indicated by an indicator when a terminal receives a handover command message or an "RRCReconfiguration" message, the transmitting PDCP entity may perform one or more of a plurality of procedures below.

As another method, if the handover command message contains an indicator to apply the fourth embodiment or the fifth embodiment proposed in the disclosure to handover, the transmitting PDCP entity may perform one or more of a plurality of procedures in the 4-1$^{st}$ embodiment below.

1. Since the transmission of data to the source base station and the target base station continues to be performed in order to minimize data interruption time, the transmitting PDCP entity does not initialize window variables (e.g., TX_NEXT) for UM DRBs.

2. If a handover command message is received from the source base station, since the terminal no longer transmits and receives the RRC messages to and from the source base station, the terminal may set window state variables (e.g., TX_NEXT) to initial values for SRBs, or may release SRBs for the source base station. In addition, the terminal may set window state variables (e.g., TX_NEXT) to initial values for SRBs of the second bearer of the target base station.

3. If a handover command message is received from the source base station, the terminal may discard all of the stored data (e.g., PDCP SDUs or PDCP PDUs) for SRBs because RRC messages need no longer to be transmitted to and received from the source base station (since the data is RRC messages produced and intended to be transmitted to the source base station, the terminal discards the data in order to avoid transmitting the same to the target base station).

As another method, if the terminal fails to perform handover to the target base station, the transmitting PDCP entity may transmit a handover failure message, an RRC connection re-establishment message, or an RRC connection recovery request message through the SRB of the source base station while maintaining a SRB connection with the source base station, thereby reducing the transmission delay due to the failure of handover. As another method, when maintaining the SRB connection with the source base station above, the terminal may discard the data (PDCP SDUs or PDCP PDUs) stored in the SRB, and may set a window state variable (e.g., TX_NEXT) to an initial value, thereby preventing the occurrence of a gap of PDCP serial numbers when transmitting a handover failure message, an RRC connection re-establishment message, or an RRC connection recovery message to the SRB of the source base station later.

4. The transmitting PDCP entity may store and prepare a new security key and a new ciphering algorithm received from an upper layer entity (e.g., an RRC entity), and may apply the same to a PDCP entity of the second bearer for the target base station and to data. In addition, the transmitting PDCP entity may continue to apply the security key and ciphering algorithm, used before receiving the new security key and ciphering algorithm from the upper layer entity, to the PDCP entity of the first bearer for the source base station and to data.

5. The transmitting PDCP entity may store and prepare a new security key and a new integrity protection algorithm received from an upper layer entity (e.g., an RRC entity), and may apply the same to the PDCP entity of the second bearer for the target base station and to data. In addition, the transmitting PDCP entity may continue to apply the security key and integrity protection algorithm, used before receiving the new security key and integrity protection algorithm from the upper layer entity, to the PDCP entity of the first bearer for the source base station and to data.

6. The transmitting PDCP entity may transmit a PDCP status report to the source base station, thereby reporting the current transmission/reception state of data (e.g., successful or unsuccessful reception of data), when it is necessary, configured, or indicated, or at all times.

7. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. As another method, if there is no indicator to continue using the buffer content for the user data compression procedure, the terminal may initialize the buffer. As another method, if dictionary information is predefined, the buffer may be initialized using the dictionary information. In addition, the terminal may apply user data compression configuration for the target base station, and may initialize the buffer.

If an upper layer entity (for example, an RRC entity) requests a 4-1$^{st}$ embodiment of a PDCP entity procedure for a certain bearer, or if a 4-1$^{st}$ embodiment of a PDCP entity procedure is indicated by an indicator when a terminal receives a handover command message or an RRC Reconfiguration message, the receiving PDCP entity may perform one or more of a plurality of procedures below.

As another method, if the handover command message contains an indicator indicating the fourth embodiment or the fifth embodiment proposed in the disclosure to handover, the receiving PDCP entity may perform one or more of a plurality of procedures in the 4-1$^{st}$ embodiment below.

1. If a handover command message is received from the source base station, since the terminal no longer transmits and receives the RRC messages to and from the source base station, the terminal may discard all of the stored data (e.g., PDCP SDUs or PDCP PDUs) for SRBs (the data is discarded because the data is the RRC messages received from the source base station).

In addition, the terminal may stop the reordering timer if the reordering timer is running. Alternatively, the terminal may release SRBs for the source base station. In addition, the terminal may set window variables (e.g., RX_NEXT and RX_DELIV) to initial values for SRBs of the second bearer for the target base station, and may stop the reordering timer if the reordering timer is running.

As another method, if the terminal fails to perform handover to the target base station, the terminal may transmit a handover failure message, an RRC connection re-establishment message, or an RRC connection recovery request message to the SRB of the source base station while maintaining a SRB connection with the source base station, thereby reducing the transmission delay due to the failure of handover. As another method, when maintaining the SRB connection with the source base station above, the receiving PDCP entity may discard the data (PDCP SDUs or PDCP PDUs) stored in the SRB, and may set a window state variable (e.g., RX_NEXT) to an initial value, thereby preventing the occurrence of a gap of PDCP serial numbers when transmitting a handover failure message, an RRC connection re-establishment message, or an RRC connection recovery message to the SRB of the source base station later.

2. Since data continues to be received from the source base station or the target base station without interruption of transmission and reception of data, a separate process on the stored data for UM DRBs is not required.

3. Since data continues to be received from the source base station or the target base station without interruption of transmission and reception of data, the receiving PDCP entity does not set window state variables (e.g., RX_NEXT and RX_DELIV) to initial values for UM DRBs.

4. The receiving PDCP entity may store and prepare a new security key and a new ciphering algorithm received from an upper layer entity (e.g., an RRC entity), and may apply the same to the PDCP entity of the second bearer for the target base station and to data. In addition, the receiving PDCP entity may continue to apply the security key and ciphering algorithm, used before receiving the new security key and ciphering algorithm from the upper layer entity, to the PDCP entity of the first bearer for the source base station and to data.

5. The receiving PDCP entity may store and prepare a new security key and a new integrity protection algorithm received from an upper layer entity (e.g., an RRC entity), and may apply the same to the PDCP entity of the second bearer for the target base station and to data. In addition, the receiving PDCP entity may continue to apply the security key and integrity protection algorithm, used before receiving the new security key and integrity protection algorithm from the upper layer entity, to the PDCP entity of the first bearer for the source base station and to data.

6. Upon receiving a PDCP status report, the receiving PDCP entity may read the current state of transmitting and receiving data to and from the source base station or the target base station (e.g., successful or unsuccessful reception of data), and may reflect the same to the transmission or retransmission of data. For example, the receiving PDCP entity may not perform transmission or retransmission on the data of which the successful delivery is confirmed.

7. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. As another method, if there is no indicator to continue using the buffer content for the user data compression procedure, the terminal may initialize the buffer. As another method, if dictionary information is predefined, the buffer may be initialized using the dictionary information. In addition, the terminal may apply user data compression configuration for the target base station, and may initialize the buffer.

If an upper layer entity (for example, an RRC entity) requests a 4-$2^{nd}$ embodiment of a PDCP entity procedure for a certain bearer, or if a third condition is satisfied, the transmitting PDCP entity of the terminal may perform the 4-$2^{nd}$ embodiment and specifically, perform one or more of a plurality of procedures below.

1. The transmitting PDCP entity may apply a new security key and a new ciphering algorithm, which are received from an upper layer entity (e.g., an RRC entity) and stored, to a PDCP entity of the second bearer for the target base station and to data. In addition, the transmitting PDCP entity may release or discard the security key and ciphering algorithm applied to the PDCP entity of the first bearer for the source base station before receiving the new security key and ciphering algorithm from the upper layer entity.

As another method, the transmitting PDCP entity may release the security key and ciphering algorithm applied to the PDCP entity of the first bearer for the source base station in the uplink, and may maintain and apply the same to the data received in the downlink. As another method, the transmitting PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

2. The transmitting PDCP entity may apply a new security key and a new integrity verification algorithm, which are received from an upper layer entity (e.g., an RRC entity) and stored, to the PDCP entity of the second bearer for the target base station and to data. In addition, the transmitting PDCP entity may release or discard the security key and ciphering algorithm applied to the PDCP entity of the first bearer for the source base station before receiving the new security key and integrity verification algorithm from the upper layer entity.

As another method, the transmitting PDCP entity may release the security key and ciphering algorithm applied to the PDCP entity of the first bearer for the source base station in the uplink, and may maintain and apply the same to the data received in the downlink. As another method, the transmitting PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

3. The transmitting PDCP entity may transmit a PDCP status report to the source base station or the target base station, thereby reporting the current transmission/reception state of data (e.g., successful or unsuccessful reception of data), when it is necessary, configured, or indicated, or at all times.

4. As to UM DRBs, the transmitting PDCP entity regards the data (e.g., PDCP SDUs), which has not been transmitted to a lower layer entity even though the PDCP serial numbers have already been assigned thereto (after discarding all of the existing stored PDCP PDUs), as the data received from an upper layer (e.g., an SDAP entity or a TCP/IP entity), and transmits data in the ascending order of COUNT values (or PDCP serial numbers) allocated before the re-establishment of the PDCP. In addition, the transmitting PDCP entity does not restart a data discard timer. Specifically, the transmitting PDCP entity performs a new header compression procedure on the data (PDCP SDUs), performs again an integrity procedure or a ciphering procedure, configures a PDCP header, and transmits the same to a lower layer entity.

5. As to AM DRBs, the transmitting PDCP entity may perform (after discarding all of the existing stored PDCP PDUs) a new header compression procedure on the data, in the ascending order of COUNT values (or PDCP serial numbers) allocated before the re-establishment of the PDCP (or before the third condition is satisfied or before the RRC message is received), from the first data (e.g., PDCP SDUs) of which the successful delivery has not been confirmed by lower layer entities (e.g., RLC entities). In addition, the transmitting PDCP entity may perform again an integrity procedure or a ciphering procedure, configures a PDCP header, and may transmit the same to a lower layer entity, thereby performing retransmission or transmission. That is, the transmitting PDCP entity may perform retransmission by accumulating data from the first data of which the successful delivery has not been confirmed.

As another method, the transmitting PDCP entity may perform retransmission only on the data of which the successful delivery has not been confirmed by lower layer entities (e.g., RLC entities) when performing retransmission. More specifically, as to AM DRBs, the transmitting PDCP entity (after discarding all of the PDCP PDUs stored to be transmitted to the source base station through a first protocol entity previously connected to the PDCP entity) may release the lower layer entities (e.g., an RLC entity or a MAC entity), which are the first protocol entities for transmitting data to the source base station. The transmitting PDCP entity may perform a new header or data compression procedure from the first data (e.g., PDCP SDUs) of which the successful transmission has not been confirmed by lower layer entities (e.g., RLC entities), which are the first protocol entities for transmitting data to the source base station, in the ascending order of COUNT values (or PDCP serial numbers) allocated before the re-establishment of the PDCP (or before the third condition is satisfied or before the RRC message is received) by applying the security key or the header compression (or data compression) protocol context corresponding to the target base station, may perform the integrity or ciphering procedure again, may configure a PDCP header, and may transmit the PDCP header to the lower layer entity, which is the second protocol entity for transmitting data to the target base station, thereby performing retransmission or transmission. That is, the transmitting PDCP entity may perform retransmission by accumulating data from the first data of which the successful delivery has not been confirmed.

As another method, when performing the retransmission, the transmitting PDCP entity transmits only the data of which the successful delivery has not been confirmed by lower layer entities (e.g., RLC entities), which are the first protocol entities for transmitting data to the source base station, to the lower layer entity, which is the second protocol entity for transmitting data to the target base station, thereby performing selective retransmission. As another method, the transmission or retransmission operation may be performed after releasing the lower layer entities (e.g., RLC entities), which are the first protocol entities for transmitting data to the source base station.

6. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. In addition, the terminal may release user data compression configuration for the source base station, and may release the buffer.

If an upper layer entity (for example, an RRC entity) requests a $4\text{-}2^{nd}$ embodiment of a PDCP entity procedure for a certain bearer, or if a third condition is satisfied, the receiving PDCP entity of the terminal may perform the $4\text{-}2^{nd}$ embodiment and specifically, perform one or more of a plurality of procedures below.

1. If there is data (e.g., PDCP PDUs) received from lower layer entities due to re-establishment of lower layer entities (e.g., RLC entities), the receiving PDCP entity processes the data.

2. Since data continues to be received from the source base station or the target base station without interruption of transmission and reception of data, a separate process on the stored data for UM DRBs is not required.

3. Since data continues to be received from the source base station or the target base station without interruption of transmission and reception of data, the receiving PDCP entity does not set window state variables (e.g., RX_NEXT and RX_DELIV) to initial values for AM DRBs or UM DRBs.

4. The receiving PDCP entity may apply a new security key and a new ciphering algorithm, which are received from an upper layer entity (e.g., an RRC entity) and stored, to the PDCP entity of the second bearer for the target base station and to data. In addition, if downlink data is no longer received from the source base station, the receiving PDCP entity may release or discard the security key and ciphering algorithm applied to the PDCP entity of the first bearer for the source base station before receiving the new security key and ciphering algorithm from the upper layer entity. As another method, the receiving PDCP entity may release the security key and ciphering algorithm applied to the PDCP entity of the first bearer for the source base station in the uplink, and may maintain and apply the same to the data received in the downlink.

As another method, the receiving PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

5. The receiving PDCP entity may apply a new security key and a new integrity verification algorithm, which are received from an upper layer entity (e.g., an RRC entity) and stored, to the PDCP entity of the second bearer for the target base station and to data. In addition, if downlink data is no longer received from the source base station, the receiving PDCP entity may release or discard the security key and ciphering algorithm applied to the PDCP entity of the first bearer for the source base station before receiving the new security key and integrity verification algorithm from the upper layer entity.

As another method, the receiving PDCP entity may release the security key and ciphering algorithm applied to the PDCP entity of the first bearer for the source base station in the uplink, and may maintain and apply the same to the data received in the downlink. As another method, the receiving PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

6. Upon receiving a PDCP status report, the receiving PDCP entity may read the current state of transmitting and receiving data to and from the source base station or the target base station (e.g., successful or unsuccessful reception of data), and may reflect the same to the transmission or retransmission of data. For example, the receiving PDCP entity may not perform transmission or retransmission on the data of which the successful delivery is confirmed.

7. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. In addition, the terminal may release user data compression configuration for the source base station, and may release the buffer.

The third condition may be one of the following conditions.

When the terminal performs a procedure of random access to the target base station through the entities of the second bearer and receives a random access response when the terminal performs a procedure of random access to the target base station through the entities of the second bearer, receives a random access response, and configures and transmits a handover completion message to the target base station when the terminal completes a procedure of random access to the target base station through the entities of the second bearer and initially transmits data using a PUCCH or PUSCH uplink transmission resource when the base station configures a separate timer for the terminal through an RRC message and the timer expires the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.

when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)

when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource when the terminal receives, from the target base station, an indication {e.g., an RRC message (e.g., an "RRCReconfiguration" message), a MAC CE, an RLC control PDU, or a PDCP control PDU} to switch the uplink to the target base station when the terminal receives, from the source base station, an indication {e.g., an RRC message (e.g., an "RRCReconfiguration" message), a MAC CE, an RLC control PDU, or a PDCP control PDU} to switch the uplink to the target base station when the terminal receives, from the target base station, an indication {e.g., an RRC message (e.g., an "RRCReconfiguration" message), a MAC CE, an RLC control PDU, or a PDCP control PDU} to release the connection with the source base station when the terminal receives, from the source base station, an indication {e.g., an RRC message (e.g., an "RRCReconfiguration" message), a MAC CE, an RLC control PDU, or a PDCP control PDU} to release the connection with the source base station when the terminal releases the connection with the source base station and releases first protocol entities when the terminal fails to receive downlink data from the source base station for a predetermined period of time when the terminal successfully completes a procedure of random access to the target base station through the entities of the second bearer, and receives a first uplink transmission resource allocated by the target base station, or receives an indication of a first uplink transmission resource for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated} the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the third condition is satisfied.

If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)

the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the third condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the third condition is satisfied.

In the case where a handover method that does not require a random access procedure (RACH-less handover) is indicated by the handover command message received by the terminal if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the third condition is satisfied. As another method, when the terminal receives a first uplink transmission resource through a PDCCH corresponding to a C-RNTI of the terminal by monitoring the PDCCH after a random access procedure is successfully completed, the terminal may determine that the third condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the third condition is satisfied. As another method, when the terminal receives a first uplink transmission resource through a PDCCH corresponding to a C-RNTI of the terminal by monitoring the PDCCH after a random access procedure is successfully completed, the terminal may determine that the third condition is satisfied.

If the third condition is not satisfied in the above step, the terminal may repeat to check the third condition while continuing the existing procedure.

Hereinafter, the disclosure proposes a fifth embodiment of the PDCP entity procedure supporting the handover procedure for minimizing data interruption time proposed in the disclosure.

In the fifth embodiment of the PDCP entity procedure proposed in the disclosure, the specific operation of a transmitting PDCP entity and a receiving PDCP entity are as follows. The fifth embodiment may be referred to as "PDCP continuation" or another name. In addition, the fifth embodiment may be configured as a 5-$1^{st}$ embodiment and a 5-$2^{nd}$ embodiment.

In the fifth embodiment of the PDCP entity procedure of the disclosure, in the PDCP entity structure shown in FIG. 11, respective lower PDCP entities 1121 and 1122 may perform header compression procedures on the data to be transmitted based on different header compression protocol contexts (e.g., ROHC contexts), and may ciphering procedures using different security keys.

Specifically, a first lower PDCP entity 1121 may apply a header compression procedure to the data (e.g., PDCP SDUs) received from an upper layer, based on a first header compression protocol context (e.g., ROHC contexts), and may encrypt the data using a first security key (a security key configured from a source base station or a target base station). In addition, a second lower PDCP entity 1122 may apply a header compression procedure to the data (e.g., PDCP SDUs) received from an upper layer, based on a second header compression protocol context (e.g., ROHC contexts), and may encrypt the data using a second security key (the security key configured from the source base station or the target base station). The two lower PDCP entities may perform the header compression procedure and the ciphering procedure in parallel, thereby reducing the data processing time and data interruption time that may occur during handover.

In the fifth embodiment of the PDCP entity procedure of the disclosure, referring to the PDCP entity structure shown in FIG. 11, lower PDCP entities 1121 and 1122 may perform deciphering procedures on the data to be received using different security keys, and may perform header decompression procedures using different header compression protocol contexts (for example, ROHC contexts).

Specifically, a first lower PDCP entity 1121 may apply a header decompression procedure to the data (e.g., PDCP SDUs) received from the lower layer entity, based on a first header compression protocol context (e.g., ROHC contexts), and may decrypt the data using a first security key (the security key configured from the source base station or the target base station). In addition, a second lower PDCP entity 1122 may apply a header decompression procedure to the data (e.g., PDCP SDUs) received from the lower layer entity, based on a second header compression protocol context (e.g., ROHC contexts), and may decrypt the data using a second security key (the security key configured from the source base station or the target base station). The two lower PDCP entities may perform the header decompression procedure and the deciphering procedure in parallel, thereby reducing the data processing time and data interruption time that may occur during handover.

In the PDCP entity structure described above, if an upper layer entity (e.g., an RRC entity) requests a 5-$1^{st}$ embodiment of a PDCP entity procedure for a certain bearer, or if a 5-$1^{st}$ embodiment of a PDCP entity procedure is indicated by an indicator when a terminal receives a handover command message or an "RRCReconfiguration" message, the transmitting PDCP entity may perform one or more of a plurality of procedures below.

As another method, if the handover command message contains an indicator indicating the fourth embodiment or the fifth embodiment proposed in the disclosure to handover, the transmitting PDCP entity may perform one or more of a plurality of procedures in the 3-$1^{st}$ embodiment below.

1. Since the transmission of data to the source base station and the target base station continues to be performed in order to minimize data interruption time, the transmitting PDCP entity does not initialize window variables (e.g., TX_NEXT) for UM DRBs.

2. If a handover command message is received from the source base station, since the terminal no longer transmits and receives the RRC messages to and from the source base station, the terminal may set window state variables (e.g., TX_NEXT) to initial values for SRBs, or may release SRBs for the source base station. In addition, the terminal may also set window state variables (e.g., TX_NEXT) to initial values for SRBs of the second bearer of the target base station.

3. If a handover command message is received from the source base station, the terminal may discard all of the stored data (e.g., PDCP SDUs or PDCP PDUs) for SRBs because RRC messages need no longer to be transmitted to and received from the source base station (since the data is RRC messages produced and intended to be transmitted to the source base station, the terminal discards the data in order to avoid transmitting the same to the target base station).

As another method, if the terminal fails to perform handover to the target base station, the terminal may transmit a handover failure message, an RRC connection re-establishment message, or an RRC connection recovery request message to the SRB of the source base station while maintaining a SRB connection with the source base station, thereby reducing the transmission delay due to the failure of handover. As another method, when maintaining the SRB connection with the source base station above, the terminal may discard the data (PDCP SDUs or PDCP PDUs) stored in the SRB, and may set a window state variable (e.g., TX_NEXT) to an initial value, thereby preventing the occurrence of a gap of PDCP serial numbers when transmitting a handover failure message, an RRC connection re-establishment message, or an RRC connection recovery message to the SRB of the source base station later.

4. The transmitting PDCP entity may store and prepare a new security key and a new ciphering algorithm received from an upper layer entity (e.g., an RRC entity), and may apply the same to a PDCP entity of the second bearer (e.g., a second lower PDCP entity) for the target base station and to data thereafter. In addition, the transmitting PDCP entity may continue to apply the security key and ciphering algorithm, used before receiving the new security key and ciphering algorithm from the upper layer entity, to the PDCP entity of the first bearer (e, a first lower ODCO entity) for the source base station and then to data.

5. The transmitting PDCP entity may store and prepare a new security key and a new integrity protection algorithm received from an upper layer entity (e.g., an RRC entity), and may apply the same to the PDCP entity of the second bearer (e.g., a second lower PDCP entity) for the target base station and to data thereafter. In addition, the transmitting PDCP entity may continue to apply the security key and integrity protection algorithm, used before receiving the new security key and integrity protection algorithm from the upper layer entity, to the PDCP entity of the first bearer (e.g., a first lower PDCP entity) for the source base station and to data.

6. The transmitting PDCP entity may transmit a PDCP status report to the source base station, thereby reporting the current transmission/reception state of data (e.g., successful or unsuccessful reception of data), when it is necessary, configured, or indicated, or at all times.

7. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. As another method, if there is no indicator to continue using the buffer content for the user data compression procedure, the terminal may initialize the buffer. As another method, if dictionary information is predefined, the buffer may be initialized using the dictionary information. In addition, the terminal may apply user data compression configuration for the target base station, and may initialize the buffer.

If an upper layer entity (for example, an RRC entity) requests a 5-$1^{st}$ embodiment of a PDCP entity procedure for a certain bearer, or if a 5-$1^{st}$ embodiment of a PDCP entity procedure is indicated by an indicator when a terminal receives a handover command message or an "RRCReconfiguration" message, the receiving PDCP entity may perform one or more of the following procedures.

As another method, if the handover command message contains an indicator indicating the fourth embodiment or the fifth embodiment proposed in the disclosure to handover, the receiving PDCP entity may perform one or more of a plurality of procedures in the 3-$1^{st}$ embodiment below.

1. If the handover command message has no indicator to continue to use the header compression protocol for each bearer of UM DRBs and AM DRBs, the terminal may initialize the header compression protocol in a PDCP entity of the second bearer (e.g., a second lower PDCP entity), and may start the same in a unidirectional (U) mode of an initialized and refreshed (IR) state.

If the handover command message has an indicator to continue to use the header compression protocol, the terminal may continue to use the header compression protocol using the header compression protocol of a PDCP entity of the first bearer (e.g., a first lower PDCP entity) for the source base station, or may perform a header decompression procedure. In addition, the terminal may continue to use the header compression protocol context without initializing the header compression protocol in the PDCP entity of the first bearer (e.g., a first lower PDCP entity) for the source base station.

2. If a handover command message is received from the source base station, since the terminal no longer transmits and receives the RRC messages to and from the source base station, the receiving PDCP entity discards all of the stored data (e.g., PDCP SDUs or PDCP PDUs) for SRBs (the data is discarded because the data is the RRC message received from the source base station). In addition, if a reordering timer is running, the terminal may stop the timer. Alternatively, the terminal may release SRBs for the source base station. In addition, the terminal may set window variables (e.g., RX_NEXT and RX_DELIV) to initial values for SRBs of the second bearer for the target base station, and may stop the reordering timer if the reordering timer is running.

As another method, if the terminal fails to perform handover to the target base station, the terminal may transmit a handover failure message, an RRC connection re-establishment message, or an RRC connection recovery request message to the SRB of the source base station while maintaining a SRB connection with the source base station, thereby reducing the transmission delay due to the failure of handover. As another method, when maintaining the SRB connection with the source base station above, the receiving PDCP entity may discard the data (PDCP SDUs or PDCP PDUs) stored in the SRB, and may set a window state variable (e.g., RX_NEXT) to an initial value, thereby preventing the occurrence of a gap of PDCP serial numbers when transmitting a handover failure message, an RRC connection re-establishment message, or an RRC connection recovery message to the SRB of the source base station later.

3. Since data continues to be received from the source base station or the target base station without interruption of transmission and reception of data, a separate process on the stored data for UM DRBs is not required.

4. If a reordering timer is running for SRBs, the terminal may stop and reset the timer. As to AM DRBs, if there is no indicator to continue using the header decompression protocol for the PDCP entity {e.g., a second (or first) lower PDCP entity} corresponding to a second (or first) bearer for the target (or source) base station, the receiving PDCP entity may perform a header decompression procedure on the stored data (e.g., PDCP SDUs) using an existing header compression protocol context. Thereafter, the receiving PDCP entity may initialize the header compression protocol context.

5. If there is no indicator to continue using the header decompression protocol for UM DRBs and AM DRBs, the receiving PDCP entity initializes downlink header decompression protocol for the PDCP entity {e.g., a second (or first) lower PDCP entity} corresponding to a second (or first) bearer for the target (or source) base station, and starts in a unidirectional (U) mode of a no context (NC) state.

6. Since data continues to be received from the source base station or the target base station without interruption of transmission and reception of data, the receiving PDCP entity does not set window state variables (e.g., RX_NEXT and RX_DELIV) to initial values for UM DRBs.

7. The receiving PDCP entity may store and prepare a new security key and a new ciphering algorithm received from an upper layer entity (e.g., an RRC entity), and may apply the same to the PDCP entity of the second bearer for the target base station and to data, or may perform deciphering. In addition, the receiving PDCP entity may continue to apply the security key and ciphering algorithm, used before receiving the new security key and ciphering algorithm from the upper layer entity, to the PDCP entity of the first bearer for the source base station and to data, or may perform deciphering.

8. The receiving PDCP entity may store and prepare a new security key and a new integrity protection algorithm received from an upper layer entity (e.g., an RRC entity), and may apply the same to the PDCP entity of the second bearer for the target base station and to data, or may perform integrity protection. In addition, the receiving PDCP entity may continue to apply the security key and integrity protection algorithm, used before receiving the new security key and integrity protection algorithm from the upper layer entity, to the PDCP entity of the first bearer for the source base station and to data, or may perform integrity protection.

9. Upon receiving a PDCP status report, the receiving PDCP entity may read the current state of transmitting and receiving data to and from the source base station or the target base station (e.g., successful or unsuccessful reception of data), and may reflect the same to the transmission or retransmission of data of the transmitting PDCP entity for the source base station or the target base station. For example, the receiving PDCP entity may not perform transmission or retransmission on the data of which the successful delivery is confirmed.

10. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. As another method, if there is no indicator to continue using the buffer content for the user data compression procedure, the terminal may initialize the buffer. As another method, if dictionary information is predefined, the buffer may be initialized using the dictionary information. In addition, the terminal may apply user data compression configuration for the target base station, and may initialize the buffer.

If an upper layer entity (for example, an RRC entity) requests a 5-$2^{nd}$ embodiment of a PDCP entity procedure for a certain bearer, or if a third condition is satisfied, the transmitting PDCP entity of the terminal may perform the 5-$2^{nd}$ embodiment and specifically, perform one or more of a plurality of procedures below.

1. If the handover command message has no indicator to continue to use the header compression protocol for each bearer of UM DRBs and AM DRBs, the terminal may initialize the header compression protocol in a PDCP entity of the second bearer (e.g., a second lower PDCP entity) for the target base station, and may start in a unidirectional (U) mode of an initialized and refreshed (IR) state.

If the handover command message has an indicator to continue to use the header compression protocol, the terminal may continue to use the header compression protocol using the header compression protocol in a PDCP entity of the first bearer (e.g., a first lower PDCP entity) for the source base station, or may perform a header decompression procedure.

2. The transmitting PDCP entity may apply a new security key and a new ciphering algorithm, which are received from an upper layer entity (e.g., an RRC entity) and stored, to a PDCP entity of the second bearer for the target base station and to data. In addition, the transmitting PDCP entity may release or discard the security key and ciphering algorithm applied to the PDCP entity of the first bearer for the source base station before receiving the new security key and ciphering algorithm from the upper layer entity.

As another method, the transmitting PDCP entity may release the security key and ciphering algorithm applied to the PDCP entity of the first bearer for the source base station in the uplink, and may maintain and apply the same to the data received in the downlink. As another method, the transmitting PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

3. The transmitting PDCP entity may apply a new security key and a new integrity verification algorithm, which are received from an upper layer entity (e.g., an RRC entity) and stored, to the PDCP entity of the second bearer for the target base station and to data. In addition, the transmitting PDCP entity may release or discard the security key and ciphering algorithm applied to the PDCP entity of the first bearer for the source base station before receiving the new security key and integrity verification algorithm from the upper layer entity.

As another method, the transmitting PDCP entity may release the security key and ciphering algorithm applied to the PDCP entity of the first bearer for the source base station in the uplink, and may maintain and apply the same to the data received in the downlink. As another method, the transmitting PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

4. The transmitting PDCP entity may transmit a PDCP status report to the source base station or the target base station, thereby reporting the current transmission/reception state of data (e.g., successful or unsuccessful reception of data), when it is necessary, configured, or indicated, or at all times.

5. As to UM DRBs, the transmitting PDCP entity regards the data (e.g., PDCP SDUs), which has not been transmitted to a lower layer entity even though the PDCP serial numbers have already been assigned thereto (after discarding all of the existing stored PDCP PDUs), as the data received from an upper layer (e.g., an SDAP entity or a TCP/IP entity), and transmits data in the ascending order of COUNT values (or PDCP serial numbers) allocated before the re-establishment of the PDCP. In addition, the terminal does not restart a data discard timer. Specifically, the transmitting PDCP entity performs a new header compression procedure on the data (PDCP SDUs), performs again an integrity procedure or a ciphering procedure, configures a PDCP header, and transmits the same to a lower layer entity.

6. As to AM DRBs, the transmitting PDCP entity may perform (after discarding all of the existing stored PDCP PDUs) a new header compression procedure on the data, in the ascending order of COUNT values (or PDCP serial numbers) allocated before the re-establishment of the PDCP (or before the third condition is satisfied or before the RRC message is received), from the first data (e.g., PDCP SDUs) of which the successful delivery has not been confirmed by lower layer entities (e.g., RLC entities). In addition, the transmitting PDCP entity may perform again an integrity procedure or a ciphering procedure, configures a PDCP header, and may transmit the same to a lower layer entity, thereby performing retransmission or transmission. That is, the transmitting PDCP entity may perform retransmission by accumulating data from the first data of which the successful delivery has not been confirmed.

As another method, the transmitting PDCP entity may perform retransmission only on the data of which the successful delivery has not been confirmed by lower layer entities (e.g., RLC entities) when performing retransmission. Alternatively, the transmitting PDCP entity may perform selective retransmission, based on a PDCP status report. More specifically, as to AM DRBs, the transmitting PDCP entity (after discarding all of the PDCP PDUs stored to be transmitted to the source base station through a first protocol entity previously connected to the PDCP entity) may release the lower layer entities (e.g., an RLC entity or a MAC entity), which are the first protocol entities for transmitting data to the source base station. The transmitting PDCP entity may perform a new header or data compression procedure from the first data (e.g., PDCP SDUs) of which the successful transmission has not been confirmed by lower layer entities (e.g., RLC entities), which are the first protocol entities, in the ascending order of COUNT values (or PDCP serial numbers) allocated before the re-establishment of the PDCP (or before the third condition is satisfied or before the RRC message is received) by applying the security key or the header compression (or data compression) protocol context corresponding to the target base station, may perform the integrity or ciphering procedure again, may configure a PDCP header, and may transmit the PDCP header to the lower layer entity, which is the second protocol entity for transmitting data to the target base station, thereby performing retransmission or transmission. That is, the transmitting PDCP entity may perform retransmission by accumulating data from the first data of which the successful delivery has not been confirmed.

As another method, when performing retransmission, the transmitting PDCP entity transmit only the data of which the successful delivery has not been confirmed by lower layer entities (e.g., RLC entities), which are first protocol entities for transmitting data to the source base station, to the lower layer entity, which is the second protocol entity for transmitting data to the target base station, thereby performing selective retransmission. As another method, the transmission or retransmission operation may be performed after releasing the lower layer entities (e.g., RLC entities or MAC entities), which are first protocol entities for transmitting data to the source base station.

7. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. In addition, the terminal may release user data compression configuration for the source base station, and may release the buffer.

If an upper layer entity (for example, an RRC entity) requests a 5-2$^{nd}$ embodiment of a PDCP entity procedure for a certain bearer, or if a third condition is satisfied, the receiving PDCP entity of the terminal may perform the 5-2$^{nd}$ embodiment and specifically, perform one or more of a plurality of procedures below.

1. If there is data (e.g., PDCP PDUs) received from lower layer entities due to re-establishment of lower layer entities (e.g., RLC entities), the receiving PDCP entity processes the data.

2. Since data continues to be received from the source base station or the target base station without interruption of transmission and reception of data, a separate process on the stored data for UM DRBs is not required.

3. Since data continues to be received from the source base station or the target base station without interruption of transmission and reception of data, the receiving PDCP entity does not set window state variables (e.g., RX_NEXT and RX_DELIV) to initial values for AM DRBs or UM DRBs.

4. The receiving PDCP entity may apply a new security key and a new ciphering algorithm, which are received from an upper layer entity (e.g., an RRC entity) and stored, to the PDCP entity of the second bearer for the target base station and to data. In addition, if downlink data is no longer received from the source base station, the receiving PDCP entity may release or discard the security key and ciphering algorithm applied to the PDCP entity of the first bearer for the source base station before receiving the new security key and ciphering algorithm from the upper layer entity.

As another method, the receiving PDCP entity may release the security key and ciphering algorithm applied to the PDCP entity of the first bearer for the source base station in the uplink, and may maintain and apply the same to the data received in the downlink. As another method, the receiving PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

5. The receiving PDCP entity may apply a new security key and a new integrity verification algorithm, which are received from an upper layer entity (e.g., an RRC entity) and stored, to the PDCP entity of the second bearer for the target base station and to data. In addition, if downlink data is no longer received from the source base station, the receiving PDCP entity may release or discard the security key and ciphering algorithm applied to the PDCP entity of the first bearer for the source base station before receiving the new security key and integrity verification algorithm from the upper layer entity.

As another method, the receiving PDCP entity may release the security key and ciphering algorithm applied to the PDCP entity of the first bearer for the source base station in the uplink, and may maintain and apply the same to the data received in the downlink. As another method, the receiving PDCP entity may discard or release the security key and ciphering algorithm applied to the PDCP entity of the first bearer for the source base station when completely releasing the connection with the source base station (e.g., downlink data reception), and may continue to apply the same to the data received from or transmitted to the source base station until the connection with the source base station is completely released.

6. Upon receiving a PDCP status report, the receiving PDCP entity may read the current state of transmitting and receiving data to and from the source base station or the target base station (e.g., successful or unsuccessful reception of data), and may reflect the same to the transmission or retransmission of data. For example, the receiving PDCP entity may not perform transmission or retransmission on the data of which the successful delivery is confirmed.

7. If a user data compression procedure (e.g., uplink data compression) is indicated to the terminal, the terminal may initialize a buffer for the user data compression procedure for the source base station or the target base station. As another method, if dictionary information is predefined, the buffer may be initialized using the dictionary information. In addition, the terminal may release user data compression configuration for the source base station, and may release the buffer.

The third condition may be one of the following conditions.
  When the terminal performs a procedure of random access to the target base station through the entities of the second bearer and receives a random access response
  when the terminal performs a procedure of random access to the target base station through the entities of the second bearer, receives a random access response, and configures and transmits a handover completion message to the target base station
  when the terminal completes a procedure of random access to the target base station through the entities of the second bearer and initially transmits data using a PUCCH or PUSCH uplink transmission resource
  when the base station configures a separate timer for the terminal through an RRC message and the timer expires
  the timer may start when the terminal receives a handover command message from the source base station, when the terminal starts random access to the target base station (when transmitting a preamble), when the terminal receives a random access response from the target base station, when the terminal transmits a handover completion message to the target base station, or when the terminal initially transmits data using a PUCCH or PUSCH uplink transmission resource.
  when the terminal performs a procedure of random access to the target base station through the entities of the second bearer, receives a random access response, and configures and transmits a handover completion message to the target base station and when the successful transmission of the handover completion message is identified by a MAC entity (HARQ ACK) or an RLC entity (RLC ACK)
  when the terminal performs a procedure of random access to the target base station through the entities of the second bearer, receives a random access response, configures and transmits a handover completion message to the target base station, and receives an uplink transmission resource that is initially allocated by the target base station, or receives an initial indication of an uplink transmission resource
  when the terminal receives, from the target base station, an indication {e.g., an RRC message (e.g., an "RRCReconfiguration" message), a MAC CE, an RLC control PDU, or a PDCP control PDU} to switch the uplink to the target base station
  when the terminal receives, from the source base station, an indication {e.g., an RRC message (e.g., an "RRCReconfiguration" message), a MAC CE, an RLC control PDU, or a PDCP control PDU} to switch the uplink to the target base station
  when the terminal receives, from the target base station, an indication {e.g., an RRC message (e.g., an "RRCReconfiguration" message), a MAC CE, an RLC control PDU, or a PDCP control PDU} to release the connection with the source base station
  when the terminal receives, from the source base station, an indication {e.g., an RRC message (e.g., an "RRCReconfiguration" message), a MAC CE, an RLC control PDU, or a PDCP control PDU} to release the connection with the source base station
  when the terminal releases the connection with the source base station and releases first protocol entities
  when the terminal fails to receive downlink data from the source base station for a predetermined period of time
  when the terminal successfully completes a procedure of random access to the target base station through the entities of the second bearer, and receives a first uplink transmission resource allocated by the target base station, or receives an indication of a first uplink transmission resource
  for example, more specifically, if the terminal is instructed to perform random access to the target base station by receiving a handover command message from the source base station, and if the indicated random access is contention-free random access (CFRA) {for example, if a predetermined preamble or a UE cell identifier (e.g., C-RNTI) is allocated}
    the terminal may determine that the random access procedure is successfully completed when the terminal transmits a predetermined preamble to the cell of the target base station and receives a random access response (RAR) message. Accordingly, when the terminal receives a first uplink transmission resource allocated, included, or indicated in the random access response message, the terminal may determine that the third condition is satisfied.
  If the terminal is instructed to perform random access to the target base station by receiving a handover command message from the source base station, and if the indicated random access is contention-based random access (CBRA) {for example, if a predetermined preamble or a UE cell identifier (e.g., C-RNTI) is not allocated)
    the terminal may determine that the procedure of random access to the target base station is successfully completed when the terminal transmits a preamble (e.g., an arbitrary preamble) to the cell of the target base station, receives a random access response (RAR) message, transmits message 3 (e.g., a handover completion message) using the uplink transmission resource allocated, included, or indicated in the random access response message, and receives a MAC CE (contention resolution MAC CE) indicating that the contention has been resolved from the target base station. Accordingly, thereafter, when the terminal monitors a PDCCH and initially receives an uplink transmission resource through the PDCCH corresponding to the C-RNTI of the terminal or initially receives an indication thereof, the terminal may determine that the third condition is satisfied. As another method, if the size of the uplink transmission resource allocated by the random access response message is sufficient enough for the terminal to further transmit uplink data, as well as message 3, the terminal may determine that an initial uplink transmission resource has been received, thereby determining that the third condition is satisfied.
  In the case where a handover method that does not require a random access procedure (RACH-less handover) is indicated by the handover command message received by the terminal
  if the handover command message includes an uplink transmission resource to the target base station the terminal may determine that the random access procedure is successfully completed when the terminal transmits message 3 (e.g., a handover completion message or an "RRCReconfigurationComplete" message) using the uplink transmission resource of the target base station and receives a UE identity confirmation MAC CE from the base station, thereby determining that the third condition is satisfied. As another method, when the terminal receives a first uplink transmission resource through a PDCCH corresponding to a C-RNTI of the terminal by monitoring the PDCCH after a random access procedure is successfully completed, the terminal may determine that the third condition is satisfied.

In the case where the handover command message does not include an uplink transmission resource for the target base station when the terminal receives an uplink transmission resource through a PDCCH corresponding to a C-RNTI of the terminal by monitoring the PDCCH for the target base station (or cell), or when the terminal transmits message 3 (e.g., a handover completion message or an "RRCReconfiguration-Complete" message) using the uplink transmission resource and receives a UE identity confirmation MAC CE from the base station, the terminal may determine that the random access procedure is successfully completed, thereby determining that the third condition is satisfied. As another method, when the terminal receives a first uplink transmission resource through a PDCCH corresponding to a C-RNTI of the terminal by monitoring the PDCCH after a random access procedure is successfully completed, the terminal may determine that the third condition is satisfied.

If the third condition is not satisfied in the above step, the terminal may repeat to check the third condition while continuing the existing procedure.

The embodiments of the PDCP entity procedure proposed in the disclosure may be extended and applied to the structure in which the upper PDCP entity performs a header compression procedure on the data transmitted in the PDCP entity structure shown in FIG. 11 using a common header compression protocol context (e.g., an ROHC context) and in which the respective lower PDCP entities 1121 and 1122 perform ciphering procedures on the data using different security keys.

In addition, the embodiments of the PDCP entity procedure proposed in the disclosure may be extended and applied to the structure in which the respective lower PDCP entities 1121 and 1122 perform deciphering procedures on the data received in the PDCP entity structure shown in FIG. 11 using different security keys and in which the upper PDCP entity performs a header decompression procedure on the data using a common header compression protocol context (e.g., an ROHC context).

According to the specific embodiments of the PDCP entity proposed in the disclosure, different procedures may be performed depending on the type of handover indicated by the handover command message received by the terminal as follows.

If the type of handover indicated in the handover command message received from the source base station by the terminal is first handover (for example, a normal handover procedure)

the terminal may perform the first embodiment of the PDCP entity proposed in the disclosure (for example, PDCP re-establishment).

If the type of handover indicated in the handover command message received from the source base station by the terminal is second handover (for example the handover method of the fourth embodiment or the fifth embodiment proposed in the disclosure), the terminal may perform the third, fourth, or fifth embodiment of the PDCP entity proposed in the disclosure (for example, PDCP entity continuation).

In addition, in the case where the source base station in the disclosure instructs the terminal to perform handover applying the embodiments proposed in the disclosure, the source base station may start forwarding data to the target base station when the following fifth condition is satisfied. The fifth condition may mean that one or more of the following conditions are satisfied.

Figure 13:
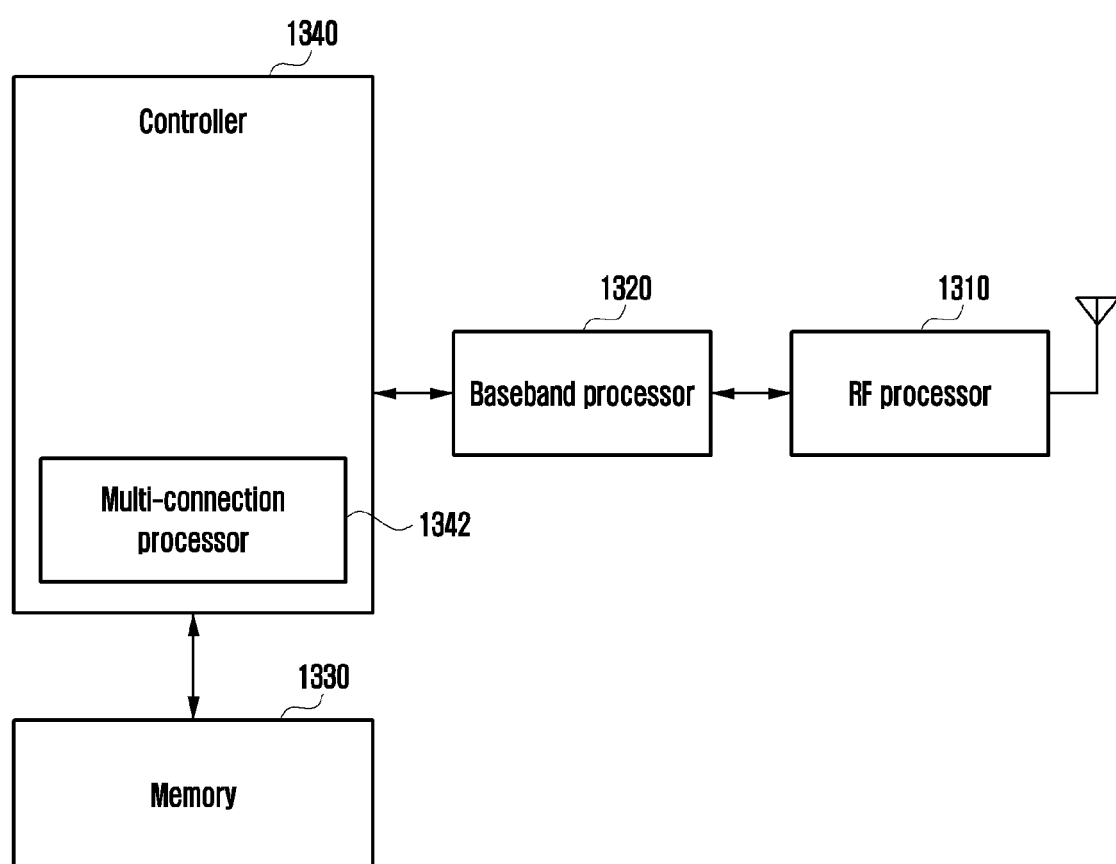
FIG. 13 illustrates the structure of a terminal to which an embodiment may be applied.

When the terminal receives an indication indicating that handover has been successfully completed from the target base station when a handover command message is transmitted to the terminal when a handover command message is transmitted to the terminal and successful delivery of the handover command message (HARQ ACK, NACK, RLC ACK, or NACK) is confirmed when the source base station receives, from the terminal, an indication to release the connection with the source base station {e.g., an RRC message (e.g., an "RRCReconfiguration" message), a MAC CE, an RLC control PDU, or a PDCP control PDU} when a predetermined timer is driven after transmitting a handover command message to the terminal and then expires when confirmation of successful transmission of downlink data (HARQ ACK, NACK, RLC ACK, or NACK) is not received from the terminal for a predetermined time FIG. 13 illustrates the structure of a terminal to which an embodiment may be applied.

Referring to FIG. 13, the terminal includes a radio frequency (RF) processor 1310, a baseband processor 1320, a storage unit 1330, and a controller 1340.

The RF processor 1310 performs a function of transmitting and receiving a signal through a radio channel, such as band conversion and amplification of a signal. That is, the RF processor 1310 up-converts a baseband signal provided from the baseband processor 1320 to an RF band signal to thus transmit the same through an antenna, and down-converts an RF band signal received through the antenna to a baseband signal. For example, the RF processor 1310 may include a transmission filter, a reception filter, an amplifier, a mixer, an oscillator, a digital-to-analog converter (DAC), an analog-to-digital converter (ADC), and the like. Although only one antenna is illustrated in FIG. 13, the terminal may have a plurality of antennas. In addition, the RF processor 1310 may include a plurality of RF chains. Further, the RF processor 1310 may perform beamforming. To perform beamforming, the RF processor 1310 may adjust the phases and magnitudes of signals transmitted and received through a plurality of antennas or antenna elements. In addition, the RF processor may perform MIMO, and may receive multiple layers when performing the MIMO operation. The RF processor 1310 may perform reception beam sweeping by appropriately setting a plurality of antennas or antenna elements under the control of the controller, or may adjust the direction and beam width of the reception beam such that the reception beam is coordinated with the transmission beam.

The baseband processor 1320 performs a function of conversion between a baseband signal and a bit string according to the physical layer specification of the system. For example, in the case of data transmission, the baseband processor 1320 encodes and modulates transmission bit strings, thereby generating complex symbols. In addition, upon receiving data, the baseband processor 1320 demodulates and decodes a baseband signal provided from the RF processor 1310 to thus recover reception bit strings. For example, in the case where an orthogonal frequency division multiplexing (OFDM) scheme is applied, when transmitting data, the baseband processor 1320 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 1320 divides the baseband signal provided from the RF processor 1310 into OFDM symbol units, restores the signals mapped to the subcarriers through a fast Fourier transform (FFT) operation, and then restores reception bit strings through demodulation and decoding.

The baseband processor 1320 and the RF processor 1310 transmit and receive signals as described above. Accordingly, the baseband processor 1320 and the RF processor 1310 may be referred to as a "transmitter", a "receiver", a "transceiver", or a "communication unit". Further, at least one of the baseband processor 1320 and the RF processor 1310 may include a plurality of communication modules in order to support a plurality of different radio access techniques. In addition, at least one of the baseband processor 1320 and the RF processor 1310 may include different communication modules to process signals in different frequency bands. For example, the different radio access techniques may include an LTE network, an NR network, and the like. In addition, the different frequency bands may include super-high frequency (SHF) (e.g., 2.5 GHz or 5 GHz) bands or millimeter wave (e.g., 60 GHz) bands.

The storage unit 1330 stores data such as fundamental programs, application programs, and configuration information for the operation of the terminal. The storage unit 1330 provides the stored data in response to a request from the controller 1340.

The controller 1340 controls the overall operation of the terminal. For example, the controller 1340 transmits and receives signals through the baseband processor 1320 and the RF processor 1310. In addition, the controller 1340 records and reads data in and from the storage unit 1330. To this end, the controller 1340 may include at least one processor. For example, the controller 1340 may include a communication processor (CP) for controlling communication and an application processor (AP) for controlling upper layers such as application programs. In some embodiments, the controller 1340 includes a multi-connection processor 1342.

Figure 14:
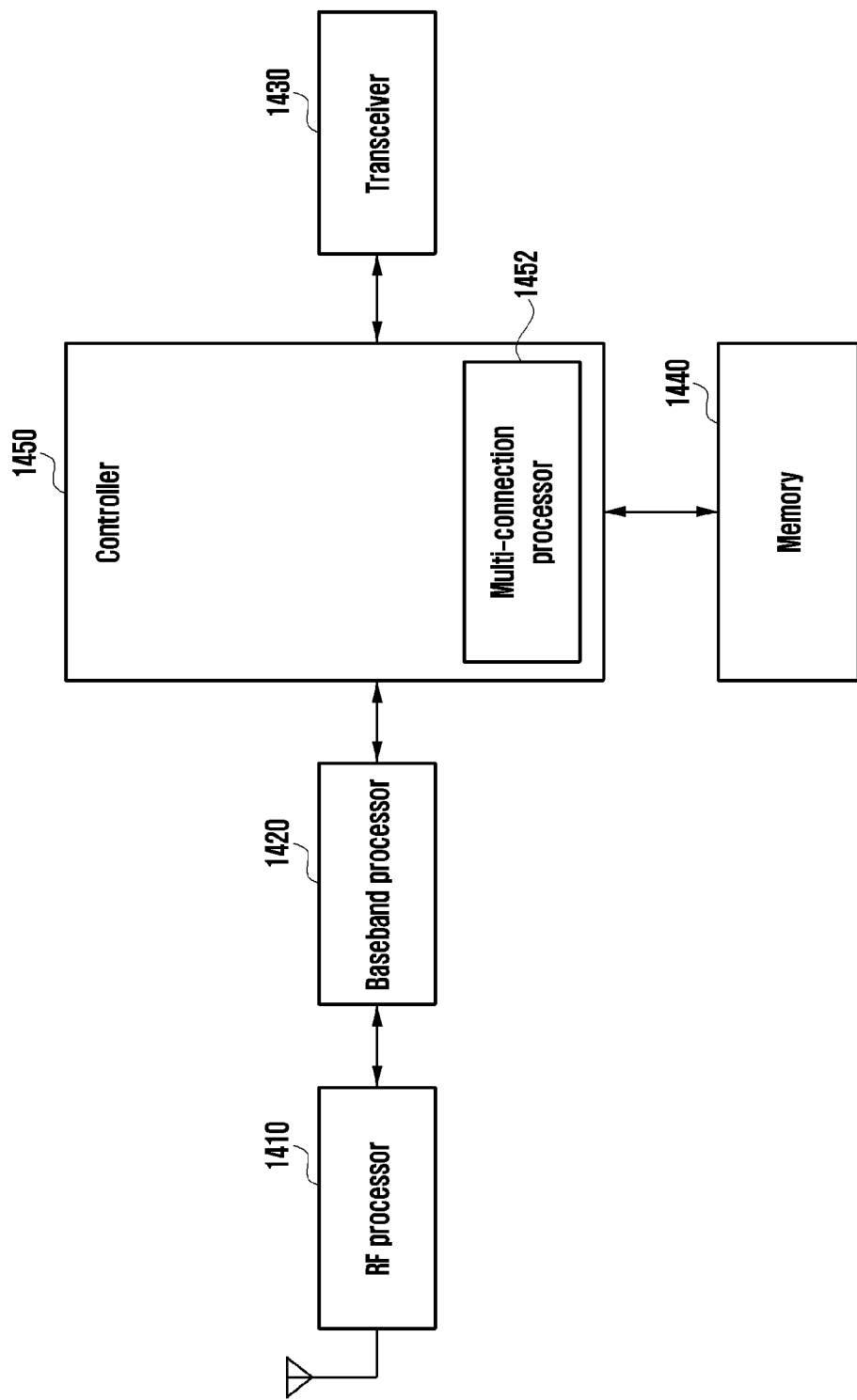
FIG. 14 illustrates a block diagram of a TRP in a wireless communication system to which an embodiment may be applied.

FIG. 14 illustrates a block diagram of a TRP in a wireless communication system to which an embodiment may be applied.

As shown in FIG. 14, the base station includes an RF processor 1410, a baseband processor 1420, a backhaul transceiver 1430, a storage unit (or memory) 1440, and a controller 1450.

The RF processor 1410 performs a function of transmitting and receiving signals, such as band conversion and amplification of a signal, through a radio channel. That is, the RF processor 1410 up-converts a baseband signal provided from the baseband processor 1420 to an RF band signal to thus transmit the same through an antenna, and down-converts an RF band signal received through the antenna to a baseband signal. For example, the RF processor 1410 may include a transmission filter, a reception filter, an amplifier, a mixer, an oscillator, a DAC, an ADC, and the like. Although only one antenna is shown in the drawing, the first access node may have a plurality of antennas. In addition, the RF processor 1410 may include a plurality of RF chains. Further, the RF processor 1410 may perform beamforming. To perform beamforming, the RF processor 1410 may adjust the phases and magnitudes of signals transmitted and received through a plurality of antennas or antenna elements. The RF processor may perform a downlink MIMO operation by transmitting one or more layers.

The baseband processor 1420 performs a function of conversion between a baseband signal and a bit string according to a physical layer specification of a first radio access technique. For example, in the case of data transmission, the baseband processor 1420 encodes and modulates transmission bit strings, thereby generating complex symbols. In addition, upon receiving data, the baseband processor 1420 demodulates and decodes a baseband signal provided from the RF processor 1410 to thus recover reception bit strings. For example, in the case where an OFDM scheme is applied, when transmitting data, the baseband processor 1420 generates complex symbols by encoding and modulating transmission bit strings, maps the complex symbols to subcarriers, and then configures OFDM symbols through the IFFT operation and CP insertion. In addition, when receiving data, the baseband processor 1420 divides the baseband signal provided from the RF processor 1410 into OFDM symbol units, restores the signals mapped to the subcarriers through the FFT operation, and then restores reception bit strings through demodulation and decoding. The baseband processor 1420 and the RF processor 1410 transmit and receive signals as described above. Accordingly, the baseband processor 1420 and the RF processor 1410 may be referred to as a "transmitter", a "receiver", a "transceiver", a "communication unit", or a "wireless communication unit".

The transceiver 1430 provides an interface for performing communication with other nodes in the network.

The storage unit 1440 stores data such as fundamental programs, application programs, and configuration information for the operation of the primary base station. In particular, the storage unit 1440 may store information about bearers allocated to a connected terminal, a measurement result reported from a connected terminal, and the like. In addition, the storage unit 1440 may store information that is a criterion for determining whether a multi-connection is provided to the terminal or is released. In addition, the storage unit 1440 provides the stored data in response to a request from the controller 1450.

The controller 1450 controls the overall operation of the primary base station. For example, the controller 1450 transmits and receives signals through the baseband processor 1420 and the RF processor 1410 or the backhaul transceiver 1430. In addition, the controller 1450 records and reads data in and from the storage unit 1440. To this end, the controller 1450 may include at least one processor. In some embodiments, the controller 1450 includes a multi-connection processor 1452.

Meanwhile, the order of explaining the method of the disclosure with reference to the accompanying drawings does not necessarily correspond to the order of executing the method, and the sequence thereof may be changed or executed in parallel.

Alternatively, only some elements may be included in the drawings describing the method of the disclosure while some elements are omitted therefrom without departing from the scope of the disclosure.

In addition, the method of the disclosure may be executed by combinations of some or all of the contents included in the respective embodiments without departing from the scope of the disclosure.

Further, the information included in the message in the disclosure is intended to explain an example of the disclosure, and some information may be omitted therefrom, or additional information may be included therein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   receiving, from a first base station, a radio resource control (RRC) message indicating handover to a second base station, the RRC message including configuration information on a data radio bearer (DRB) for the handover using a dual protocol stack, wherein the DRB is associated with a radio link control (RLC)-acknowledged mode (AM) bearer or a RLC-unacknowledged mode (UM) bearer;
   identifying a medium access control (MAC) entity associated with the second base station based on the RRC message;
   identifying a RLC entity for the DRB associated with the second base station;
   identifying a packet data convergence protocol (PDCP) entity for the DRB, the PDCP entity being associated with a RLC entity associated with the first base station and the RLC entity associated with the second base station; and
   performing, at the PDCP entity, transmission of a PDCP service data unit (SDU) to the RLC entity associated with the second base station based on successful completion of a random access procedure with the second base station.

2. The method of claim 1, wherein the performing comprises:
   performing, at the PDCP entity for the DRB associated with the RLC-AM bearer, transmission of all of one or more PDCP SDUs from a first PDCP SDU in an ascending order of a counter value associated with a corresponding PDCP SDU to the RLC entity associated with the second base station, based on the successful completion of the random access procedure,
   wherein a successful delivery of the first PDCP SDU has not been confirmed by the RLC entity associated with the first base station, and
   wherein the one or more PDCP SDUs are already associated with PDCP sequence numbers (SNs).

3. The method of claim 2, wherein the performing comprises:
   performing, at the PDCP entity for the DRB associated with the RLC-AM bearer, a header compression of the one or more PDCP SDUs based on a robust header compression (ROHC) protocol;
   performing, at the PDCP entity for the DRB associated with the RLC-AM bearer, an integrity protection and ciphering of the one or more PDCP SDUs based on security information for the second base station; and
   submitting, at the PDCP entity for the DRB associated with the RLC-AM bearer, the one or more PDCP SDUs to the RLC entity associated with the second base station.

4. The method of claim 1, wherein the performing comprises:
   performing, at the PDCP entity for the DRB associated with the RLC-UM bearer, transmission of all of one or more PDCP service data units (SDUs) in an ascending order of a counter value associated with a corresponding PDCP SDU to the RLC entity associated with the second base station, based on the successful completion of the random access procedure,
   wherein the one or more PDCP SDUs have been processed by the PDCP entity and have not yet been submitted to the RLC entity associated with the first base station.

5. The method of claim 4, wherein the performing comprises:
   performing, at the PDCP entity for the DRB associated with the RLC-UM bearer, a header compression of the one or more PDCP SDUs based on a robust header compression (ROHC) protocol;
   performing, at the PDCP entity for the DRB associated with the RLC-UM bearer, an integrity protection and ciphering of the one or more PDCP SDUs based on security information for the second base station; and
   submitting, at the PDCP entity for the DRB associated with the RLC-UM bearer, the one or more PDCP SDUs to the RLC entity associated with the second base station.

6. The method of claim 1, further comprising:
   in case that the PDCP entity is configured to transmit a PDCP status report, transmitting, at the PDCP entity, a PDCP status report to the first base station based on the successful completion of the random access procedure.

7. The method of claim 1,
   wherein the PDCP entity is configured with separate security information for the first base station and the second base station, and
   wherein a state variable used in the PDCP entity is not reset.

8. A terminal in a communication system, comprising:
   a transceiver; and
   a controller coupled with the transceiver and configured to:
   receive, from a first base station, a radio resource control (RRC) message indicating handover to a second base station, the RRC message including configuration information on a data radio bearer (DRB) for the handover using a dual protocol stack, wherein the DRB is associated with a radio link control (RLC)-acknowledged mode (AM) bearer or a RLC-unacknowledged mode (UM) bearer,
   identify a medium access control (MAC) entity associated with the second base station based on the RRC message,
   identify a RLC entity for the DRB associated with the second base station,
   identify a packet data convergence protocol (PDCP) entity for the DRB, the PDCP entity being associated with a RLC entity associated with the first base station and the RLC entity associated with the second base station, and perform, at the PDCP entity, transmission of a PDCP service data unit (SDU) to the RLC entity associated with the second base station based on successful completion of a random access procedure with the second base station.

9. The terminal of claim 8, wherein the controller is configured to:

perform, at the PDCP entity for the DRB associated with the RLC-AM bearer, transmission of all of one or more PDCP SDUs from a first PDCP SDU in an ascending order of a counter value associated with a corresponding PDCP SDU to the RLC entity associated with the second base station, based on the successful completion of the random access procedure, wherein a successful delivery of the first PDCP SDU has not been confirmed by the RLC entity associated with the first base station, and wherein the one or more PDCP SDUs are already associated with PDCP sequence numbers (SNs).

10. The terminal of claim 9, wherein the controller is configured to:

perform, at the PDCP entity for the DRB associated with the RLC-AM bearer, a header compression of the one or more PDCP SDUs based on a robust header compression (ROHC) protocol, perform, at the PDCP entity for the DRB associated with the RLC-AM bearer, an integrity protection and ciphering of the one or more PDCP SDUs based on security information for the second base station, and submit, at the PDCP entity for the DRB associated with the RLC-AM bearer, the one or more PDCP SDUs to the RLC entity associated with the second base station.

11. The terminal of claim 8, wherein the controller is configured to:

perform, at the PDCP entity for the DRB associated with the RLC-UM bearer, transmission of all of one or more PDCP service data units (SDUs) in an ascending order of a counter value associated with a corresponding PDCP SDU to the RLC entity associated with the second base station, based on the successful completion of the random access procedure, wherein the one or more PDCP SDUs have been processed by the PDCP entity and have not yet been submitted to the RLC entity associated with the first base station.

12. The terminal of claim 11, wherein the controller is configured to:

perform, at the PDCP entity for the DRB associated with the RLC-UM bearer, a header compression of the one or more PDCP SDUs based on a robust header compression (ROHC) protocol, perform, at the PDCP entity for the DRB associated with the RLC-UM bearer, an integrity protection and ciphering of the one or more PDCP SDUs based on security information for the second base station, and submit, at the PDCP entity for the DRB associated with the RLC-UM bearer, the one or more PDCP SDUs to the RLC entity associated with the second base station.

13. The terminal of claim 8, wherein the controller is further configured to:

in case that the PDCP entity is configured to transmit a PDCP status report, transmit, at the PDCP entity, a PDCP status report to the first base station based on the successful completion of the random access procedure.

14. The terminal of claim 8, wherein the PDCP entity is configured with separate security information for the first base station and the second base station, and wherein a state variable used in the PDCP entity is not reset.

* * * * *